United States Patent
Sandell et al.

(10) Patent No.: US 7,838,605 B2
(45) Date of Patent: *Nov. 23, 2010

(54) POLYMERIZATION MONITORING AND CONTROL USING IMPROVED LEADING INDICATORS

(75) Inventors: David Jack Sandell, Beaumont, TX (US); Marjorie E. King, Baton Rouge, LA (US); Fred David Ehrman, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 1383 days.

This patent is subject to a terminal disclaimer.

(21) Appl. No.: 10/953,263

(22) Filed: Sep. 29, 2004

(65) Prior Publication Data

US 2005/0267267 A1    Dec. 1, 2005

Related U.S. Application Data

(60) Provisional application No. 60/512,502, filed on Oct. 17, 2003, provisional application No. 60/512,355, filed on Oct. 17, 2003.

(51) Int. Cl.
  *C08F 2/00*   (2006.01)
  *C08F 4/00*   (2006.01)
(52) U.S. Cl. .............................. 526/66; 526/68; 526/69; 526/90
(58) Field of Classification Search .................. 526/66, 526/68, 69, 90, 901, 902, 943, 348
See application file for complete search history.

(56) References Cited

U.S. PATENT DOCUMENTS

| | | | |
|---|---|---|---|
| 4,243,619 A | 1/1981 | Fraser et al. | |
| 4,543,399 A | 9/1985 | Jenkins, III et al. | |
| 4,588,790 A | 5/1986 | Jenkins, III et al. | |
| 5,151,474 A | 9/1992 | Lange et al. | |
| 5,352,749 A | 10/1994 | DeChellis et al. | |
| 5,405,922 A | 4/1995 | DeChellis et al. | |
| 5,436,304 A | 7/1995 | Griffin et al. | |
| 5,462,999 A | 10/1995 | Griffin et al. | |
| 5,525,678 A | 6/1996 | Mink et al. | |
| 6,144,897 A | 11/2000 | Selliers | 700/269 |
| 6,207,606 B1 * | 3/2001 | Lue et al. | 502/113 |
| 6,218,484 B1 | 4/2001 | Brown et al. | |
| 6,385,558 B1 | 5/2002 | Schlemm | 702/182 |
| 6,723,804 B1 | 4/2004 | Battiste | 526/60 |

FOREIGN PATENT DOCUMENTS

| EP | 1259554 | 5/2004 |
|---|---|---|
| WO | WO 03/044061 | 5/2003 |

* cited by examiner

*Primary Examiner*—William K Cheung
(74) *Attorney, Agent, or Firm*—Kevin M. Faulkner; Leandro Arechederra, III

(57) ABSTRACT

Embodiments of our invention relate generally to methods of monitoring and controlling polymerization reactions including reactions producing multimodal polymer products using multiple catalysts in a single reactor. Embodiments of the invention provide methods of rapidly monitoring and controlling polymerization reactions without the need to sample and test the polymer properties. The method uses reactor control data and material inventory data in a mathematical leading indicator function to control the reactor conditions, and thereby the products produced under those conditions.

27 Claims, 4 Drawing Sheets

Gas Phase Fluidized Bed Reactor

Figure 1. Gas Phase Fluidized Bed Reactor
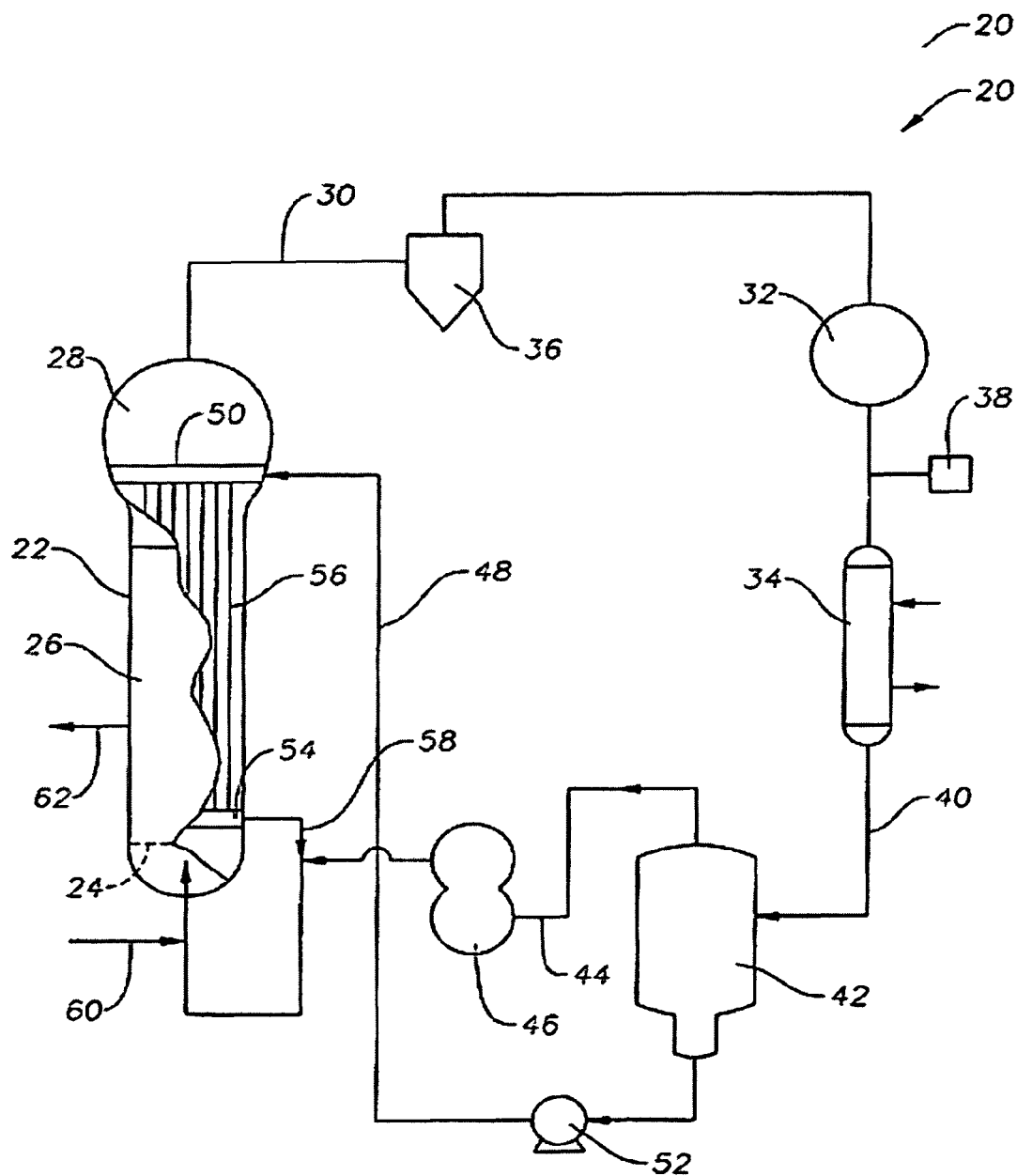

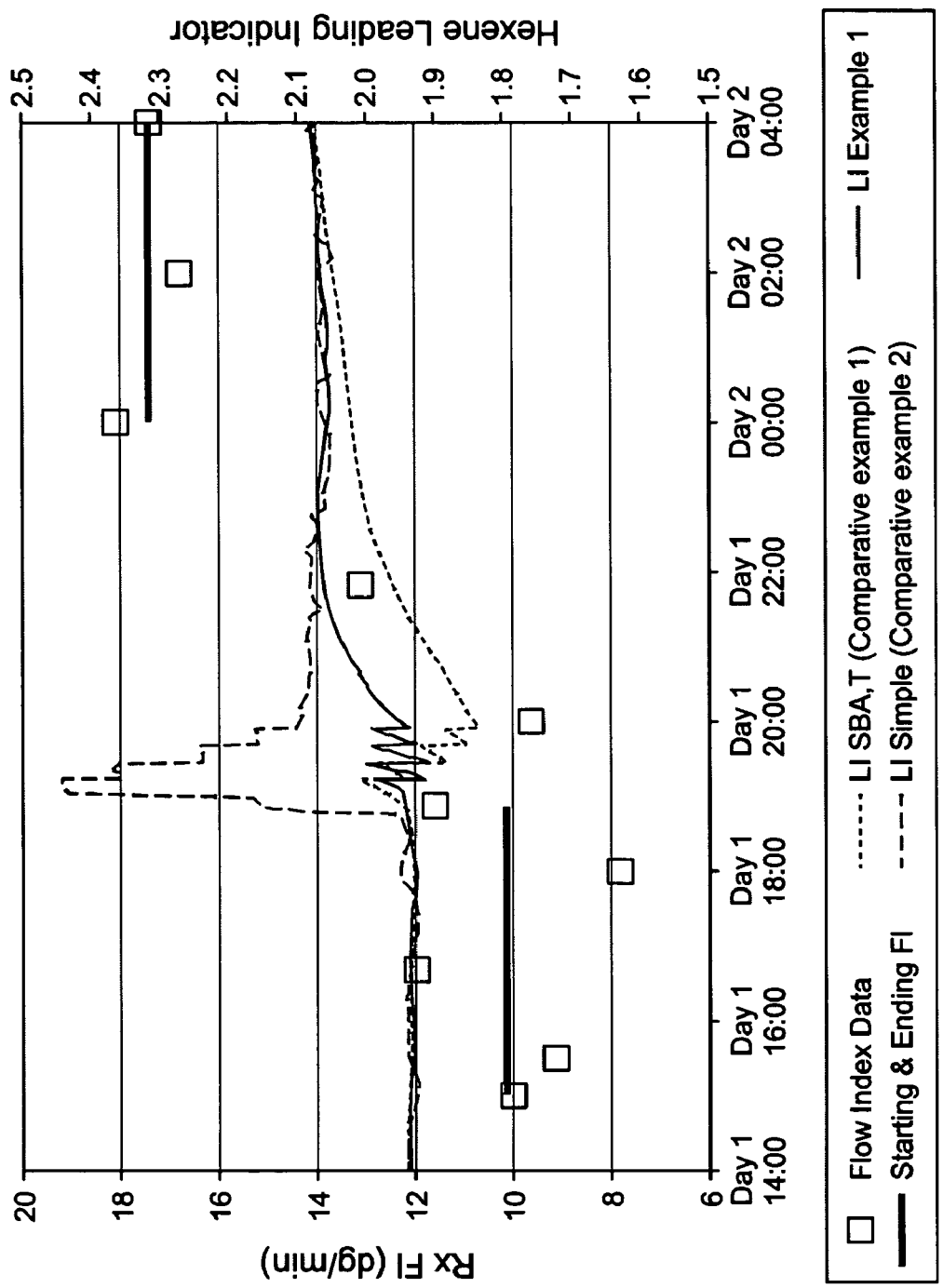

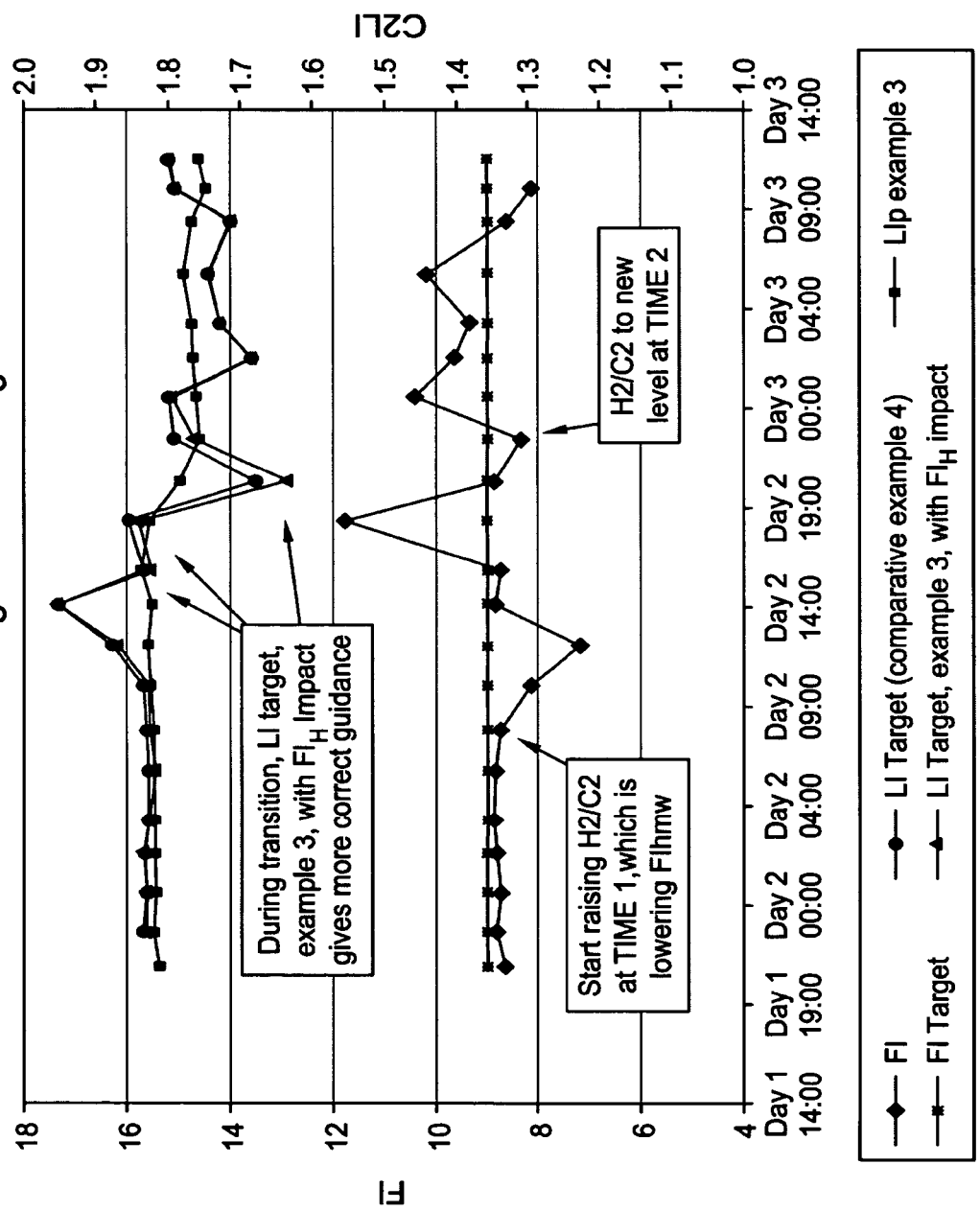

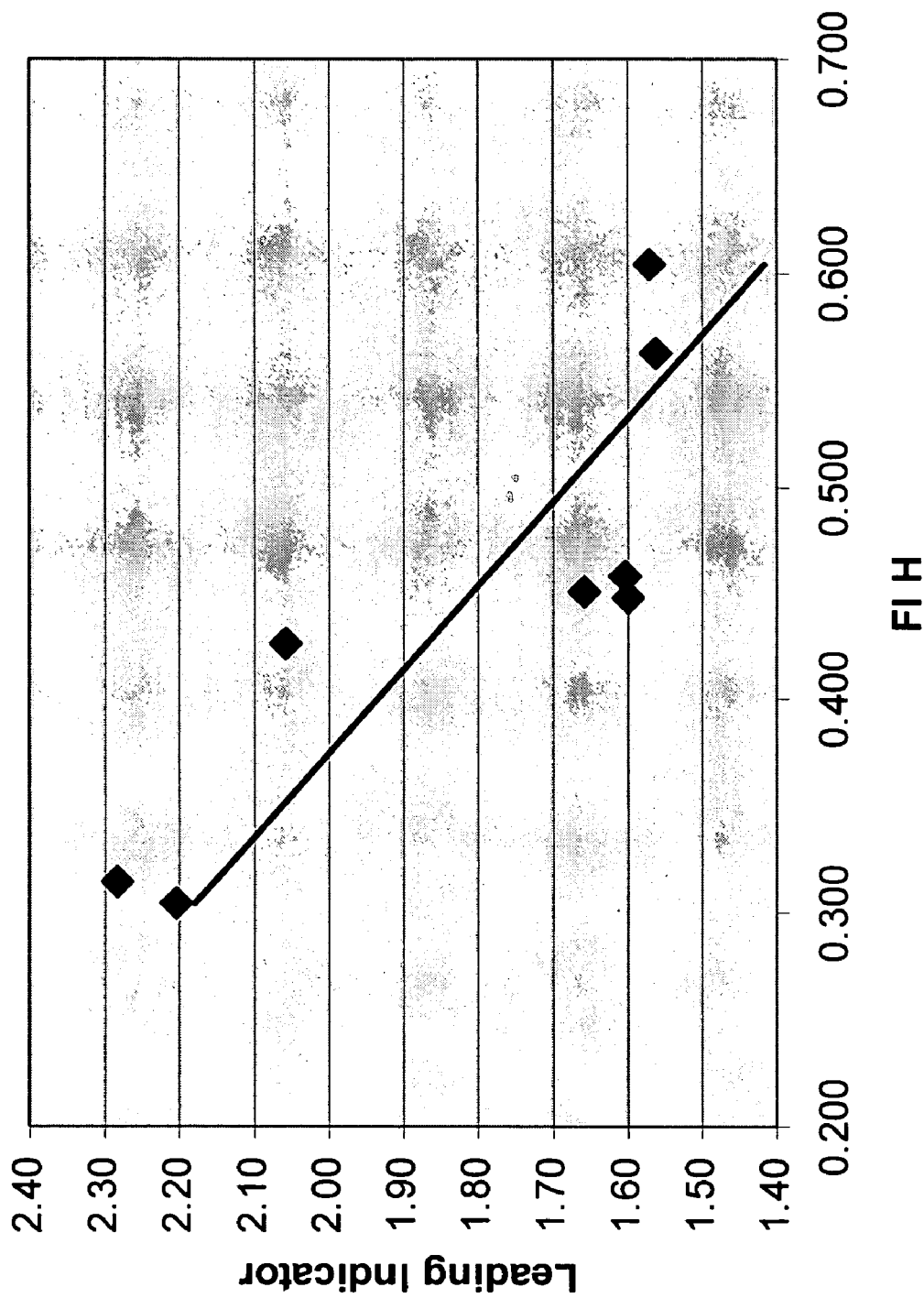

POLYMERIZATION MONITORING AND CONTROL USING IMPROVED LEADING INDICATORS

CROSS-REFERENCE TO RELATED APPLICATION

The present application claims priority to U.S. Provisional Applications 60/512,502 and 60/512,355, both filed Oct. 17, 2003 and are herein incorporated by reference.

TECHNICAL FIELD

Embodiments of the present invention provide methods of rapidly monitoring and controlling polymerization reactions. The methods use mathematical functions derived from the reactor process data, the mathematical functions being described as "Leading Indicators" (LI).

BACKGROUND

Attempts at controlling dynamic, continuous processes, including polyolefin production processes have been a long standing goal of the process industry.

Gas phase processes for the homopolymerization and copolymerization of monomers, especially olefin monomers, are well known in the art. Such processes can be conducted, for example, by introducing the gaseous monomer or monomers into a stirred and/or fluidized bed of resin particles and catalyst.

In the fluidized-bed polymerization of olefins, the polymerization is conducted in a fluidized-bed reactor, wherein a bed of polymer particles is maintained in a fluidized state by means of an ascending gas stream including gaseous reaction monomer. The polymerization of olefins in a stirred-bed reactor differs from polymerization in a gas fluidized-bed reactor by the action of a mechanical stirrer within the reaction zone, which contributes to fluidization of the bed. As used herein, the term "fluidized-bed" also includes stirred-bed processes and reactors.

The start-up of a fluidized bed reactor generally uses a bed of preformed polymer particles. During the course of polymerization, fresh polymer is generated by the catalytic polymerization of the monomer, and polymer product is withdrawn to maintain the bed at constant volume. An industrially favored process employs a fluidization grid to distribute the fluidizing gas to the bed, and also to act as a support for the bed when the supply of gas is cut off. The polymer produced is generally withdrawn from the reactor via one or more discharge conduits disposed in the lower portion of the reactor, near the fluidization grid. The fluidized bed includes a bed of growing polymer particles, polymer product particles and catalyst particles. This reaction mixture is maintained in a fluidized condition by the continuous upward flow from the base of the reactor of a fluidizing gas which includes recycle gas drawn from the top of the reactor, together with added make-up monomer. The fluidizing gas enters the bottom of the reactor and is passed through a fluidization grid, upwardly through the fluidized bed.

A variety of gas phase polymerization processes are known. For example, the recycle stream can be cooled to a temperature below the dew point, resulting in condensing a portion of the recycle stream, as described in U.S. Pat. Nos. 4,543,399 and 4,588,790. This intentional introduction of a liquid into a recycle stream or reactor during the process is referred to generally as a "condensed mode" operation.

Further details of fluidized bed reactors and their operation are disclosed in, for example, U.S. Pat. Nos. 4,243,619, 4,543,399, 5,352,749, 5,436,304, 5,405,922, 5,462,999, and 6,218,484, the disclosures of which are incorporated herein by reference.

For example, U.S. Pat. No. 5,525,678 suggests a catalyst including a zirconium metallocene that produces a relatively low molecular weight, high comonomer-content polymer, and a titanium non-metallocene that produces a relatively high molecular weight, low comonomer-content polymer. Typically, ethylene is the primary monomer, and small amounts of hexene or other alpha-olefins are added to lower the density of the polyethylene. The zirconium catalyst incorporates most of the comonomer and hydrogen, so that, in a typical example, about 85% of the hexene and 92% of the hydrogen are in the low molecular weight polymer. Water is added to control the overall molecular weight by controlling the activity of the zirconium catalyst.

When polymerizing with two or more catalysts, it is desirable to monitor and control the relative contribution of each catalyst to the polymer product, so that the polymerization conditions can be adjusted to obtain the desired polymer properties. The properties of the polymer produced in the reactor are affected by a variety of operating parameters, such as reaction temperature, monomer feed rates, catalyst feed rates, co-catalyst feed rates, hydrogen gas concentration, or water feed rate. In order to produce polymer having a desired set of properties, polymer exiting the reactor is sampled and laboratory measurements carried out to characterize the polymer. If it is discovered that one or more polymer properties are outside a desired range, polymerization conditions can be adjusted, and the polymer resampled. This periodic sampling, testing and adjusting, however, is undesirably slow, since sampling and laboratory testing of polymer properties is time-consuming. As a result, conventional processes can produce large quantities of "off-specification" polymer before manual testing and reactor control can effectively adjust the polymerization conditions.

In WO 03/044061 a rolling average of a ratio of two gas phase component concentrations, each concentration in turn expressed as a component's gas phase mole fraction divided by its feed rate into the reactor, as seen in equation (7) on page 13 of that publication, is referred to as a LI. The LI gives an indication of the polymer properties being produced, without waiting for manual product analysis. This technique results in improved control compared to the prior art. However, using the technique of WO 03/044061 yields somewhat inaccurate control when feed ratios change and also the equation did not consider methods to choose the leading indicator target. Further, improvements made in industrial use applied a leading indicator based on a weighting factor in turn based on polymer residence time in the reactor. While using this latter method, the leading indicator based on polymer residence time, gave a better indication of reactor behavior than the rolling average of WO 03/044061, a quicker, more responsive leading indicator was sought. Such a more responsive leading indicator might allow improved, more timely control of polymerization processes, and in so doing, permit reduction of off-test or off-specification polymer in response to either unintended reactor variable perturbations, or minimizing such off-test or off-specification polymer in response to an intended change in reactor variables, such as when changing such variables to achieve a different class of material by effecting a change to polymer properties such as melt index, flow index, density, molecular weight, molecular weight distribution or combinations thereof by adjusting reactor variables.

Thus, it would be desirable to have faster methods and more accurate methods for monitoring and/or predicting changes in polymer properties, or changes in relative activities of catalysts, especially in multiple catalyst processes. In addition, it would be desirable to have methods to predict what reactor conditions would be required, based on simple reactor data and product properties, to produce a particular type or kind of polymer product. It is especially important to minimize the production of polymer product that does not meet desired specifications during times when the reactor process conditions are changing (either deliberately or through process parameter drift).

SUMMARY

Among the embodiments of our invention are a method of olefin polymerization, the method comprising: (a) determining a flow ratio to a polymerization reactor, $FR_1$, of a comonomer or hydrogen flow rate to a monomer flow rate provided to the reactor; determining the concentration ratio, $GR_1$, of the concentration of the selected comonomer or hydrogen concentration to the monomer concentration in a recycle gas stream of the reactor, (b) obtaining a leading indicator function, LI, defined by:

$$LI = \frac{FR_1}{GR_1} = \frac{(\beta)(FR_2) + (1-\beta)(FR_3)}{GR_1} \quad (1a)$$

where $GR_1$ is the present value of either of the comonomer/ethylene concentration ratio or the present value of the hydrogen/ethylene concentration ratio at time T in the reactor, as determined by analysis of the recycle gas stream; where $FR_1$ is the present value of the flow ratio into the reactor of either of the comonomer/ethylene ratio or the present value of the hydrogen/ethylene ratio, expressed as an exponentially weighted moving average (EWMA) at time T; where $FR_2$ is the instantaneous flow ratio td minutes prior to time T; where $FR_3$ is an EWMA using the comonomer or hydrogen residence time td minutes prior to time T−1; where $\beta=1-\exp(-T/(\text{comonomer residence time})) = 1-\exp(-\Delta t/\tau)$; where $\Delta t$=the time step chosen to update the LI calculation; where $\tau$=the residence time in the reactor of the comonomer or hydrogen that is used to calculate the LI with the proviso that the comonomer dissolved in the polymerized olefin is included in said comonomer used to calculate the LI; (c) comparing the LI to a target value; and (d) adjusting at least one reactor parameter in response to a deviation between the LI and the target value.

In another embodiment a method to achieve control of a leading indicator in a gas phase polymerization reaction in a polymerization reactor, is contemplated comprising: a) calculating a leading indicator, (LI), such that the numerator and denominator have the same dynamic response to process changes; b) choosing at least one process sensitive variable to manipulate to control said leading indicator (LI); c) manipulating the process sensitive variable; and d) removing a polymer product.

In another embodiment a process for polymerizing olefins in a gas-phase fluidized bed polymerization reactor is contemplated, the process comprising: (a) determining a flow ratio into the polymerization reactor, $FR_1$, of a comonomer or hydrogen flow rate to a monomer flow rate provided to the reactor; determining the concentration ratio, $GR_1$, of the selected comonomer or hydrogen concentration to the monomer concentration in a recycle gas stream of the reactor, (b) obtaining a leading indicator function, LI, defined by:

$$LI = \frac{FR_1}{GR_1} = \frac{(\beta)(FR_2) + (1-\beta)(FR_3)}{GR_1} \quad (1a)$$

where $GR_1$ is the present value of either of the comonomer/ethylene concentration ratio or the present value of the hydrogen/ethylene concentration ratio at time T in the reactor, as determined by analysis of the recycle gas stream; where $FR_1$ is the present value of the flow ratio into the reactor of either of the comonomer/ethylene ratio or the present value of the hydrogen/ethylene ratio, expressed as an exponentially weighted moving average (EWMA) at time T; where $FR_2$ is the instantaneous flow ratio td minutes prior to time T; where $FR_3$ is an EWMA using the comonomer or hydrogen residence time td minutes prior to time T−1; where $\beta=1-\exp(-T/(\text{comonomer residence time})) = 1-\exp(-\Delta t/\tau)$; where $\Delta t$=the time step chosen to update the LI calculation; where $\tau$=the residence time in the reactor of the one of comonomer or hydrogen that is used to calculate the LI, with the proviso that the comonomer dissolved in a polymer made in the olefin polymerization, is included in said comonomer used to calculate the LI; (c) comparing the LI to a target value; and (d) adjusting at least one reactor parameter in response to a deviation between the LI and the target value; wherein said polymerization comprises said ethylene, said comonomer selected from 1-butene, 1-hexene or combinations thereof, and hydrogen; wherein the olefin polymerization is catalyzed by a supported bimetallic catalyst system comprising at least one metallocene catalyst and at least one non-metallocene transition metal catalyst, and wherein said polymer product comprises a molecular weight distribution, a composition distribution, or both a molecular weight distribution and a composition distribution, that are broad or bimodal, or both broad and bimodal; wherein the at least one metallocene catalyst compound is $(RCp)_2MX_2$, wherein Cp is a substituted cyclopentadienyl ring, M is zirconium; R is a n-butyl, and X is fluoride; wherein the at least one reactor parameter is selected from the group consisting of monomer feed rate, comonomer feed rates, catalyst feed rates, cocatalyst feed rates, hydrogen feed rate, reactor temperature, monomer partial pressure, comonomer partial pressure, hydrogen partial pressure, water feed rate, carbon dioxide feed rate, impurity feedrate, condensing agent feedrate, isopropyl alcohol feedrate, oxygen feedrate, and combinations thereof.

The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following description taken in conjunction with the accompanying drawings, in which:

FIG. 1 illustrates a fluidized bed reactor generally useful in the practice the embodiments of the present invention.

FIG. 2 shows the response of the leading indicators of embodiments of our invention as a function of time, compared to other, comparative leading indicator functions. The figure shows the correct-phase comparison between a leading indicator of embodiments of our invention and the change in FI of a resin (polyolefin) being produced using the catalyst system disclosed below.

FIG. 3 illustrates the change in target leading indicator $LI_T$ and a method to efficiently determine the best $LI_T$ in case of changes in reactor parameters.

FIG. 4 shows the impact of $FI_H$ changes on the LI.

DESCRIPTION

In one embodiment of our invention we describe a method of polymerizing olefins. Using analysis of reaction component concentrations in a reactor and reaction component feed rates to a reactor we have applied mathematical analysis and manipulation to derive a highly accurate and very predictive leading indicator. These leading indicators provide for rapid diagnosis of reactor variable perturbations and the impact such perturbations have on the polymer produced, permitting rapid recovery from unplanned variable changes. Additionally, such leading indicators permit operators to make deliberate changes in polymer characteristics (based on purposely changing one or more reactor variables) and to make such deliberate changes with a shorter, more economical transition time from one set of characteristics to another.

The methods of embodiments of our invention are applicable to several reactor types, for example, solution reactors, slurry loop reactors, supercritical loop reactors, or fluidized-bed, gas-phase reactors. While the discussion herein uses fluidized-bed, gas-phase reactors as an example, it should be understood that the methods are applicable to the other reactor types.

Leading Indicators

As used herein, the term "leading indicator" is used to mean a function of a ratio of at least two component concentrations, each concentration in turn may be expressed as a component's mole fraction divided by its feed rate (in suitable units known in the art such as mass per unit time, or corrected volume per unit time) into the reactor. Thus, a leading indicator ("LI") can be expressed as the mole fraction $\chi_i$, the mole fraction of the i'th component based on the total moles of components, or based on a subset of the components. Alternatively, a leading indicator can be based on a mathematically rearranged formula based on the ratio of reactor component feeds and the reactor concentrations; the latter measured at a suitable location in the reactor. While in the present document we discuss gas phase concentrations or component feed rates into a reactor, these terms apply equally to solution or slurry reactors, where the concentrations and flow rates will refer to liquid or slurry concentrations or feed rates. Any discussion of gas ratio in a reactor or gas flow rates or ratios will be understood to mean alternately a component concentration and a component feed rate, where the reactants are liquids or slurries as usually employed in the reaction mechanisms discussed herein.

In one aspect of the present invention we provide a method of polymerizing olefins in a gas-phase fluidized bed reactor utilizing leading indicators. For example, concentrations or gas ratios, GR, of two reaction components, for instance, the primary monomer, such as ethylene or propylene, and comonomer (such as butene-1, hexene-1 and/or octene-1) or hydrogen, are determined in the recycle gas stream of the reactor. Analysis of the gas ratio (GR) is determinative of the gas ratio inside the reactor at a specific time. The gas ratio or ratios (GR) are compared to the flow ratios (FR) of the reaction components into the reactor. These ratios (FR and GR) are incorporated with exponential weighting factors (or filter constants) to provide leading indicator functions, LI, which are useful to control an ongoing polymerization reaction or to change reaction conditions in a reactor to produce different polymers or in other words to alter polymer physical properties, or useful to control polymers produced by multiple catalyst systems where the multiple catalysts may be the same or different and the catalyst systems producing polymers that may have multimodal molecular weight distributions and/or comonomer contents. In this embodiment, the Leading Indicator measurement is concerned with the current, actual state of a reactor and the calculation/equation shown below uses reactor variables to determine the current Leading Indicator. Control of the leading indicator function may be achieved by manual, automatic, or a combination of manual and automatic adjustments of reactor conditions Because analysis of the recycle gas stream to determine gas ratio or ratios (GR), takes a finite time (td or delay time) and it also takes a finite time for the gas ratio or ratios (GR) to change in response to a flow ratio (FR) change, a manipulation (dynamic compensation) must be performed on the numerator to keep the numerator and denominator in phase and the leading indicator (LI) accurate. Whichever ratio is used in the denominator will also be used in the numerator, that is, if ethylene to comonomer is the ratio in the denominator, the ethylene to comonomer ratio will also be the basis for the numerator. Or, if ethylene to hydrogen is the ratio in the denominator, the ethylene to hydrogen ratio will also be the basis for the numerator. In one aspect of the invention, a leading indicator (LI) is calculated according to the following general equation/calculation (1a). Note, for convenience and consistency, the notation for the various components of the calculation is different than earlier presented in Provisional Applications 60/512,502 and 60/512,355. Both versions are shown below with cross reference to the previous version of the calculation/equation (here (1)):

$$LI = \frac{FR_{avg,T}}{GR_{inst.T}} = \frac{(WF_{pref} \times FR_{inst.T-td}) + (1 - WF_{pref}) \times FR_{avg,(T-td)-1}}{GR_{inst.T}} \quad (1)$$

$$LI = \frac{FR_1}{GR_1} = \frac{(\beta)(FR_2) + (1-\beta)(FR_3)}{GR_1} \quad (1a)$$

Where $GR_1 = GR_{inst.T}$=present value of either of the comonomer/ethylene gas ratio or the present value of the hydrogen/ethylene gas ratio at time T(now) in the reactor, as determined by analysis of the recycle stream.

Where $FR_1 = FR_{avg, T}$=the present value of the flow ratio of either of the comonomer/ethylene ratio or the present value of the hydrogen/ethylene ratio expressed as an exponentially weighted moving average (EWMA) at time T.

Where $FR_2$ $FR_{inst. T-td}$=the instantaneous Flow Ratio td minutes prior to time step T.

Where $FR_3 = FR_{avg., (T-td)}-1$ =a EWMA using the comonomer or hydrogen residence time td minutes prior to time step T−1.

$\beta = WF_{pref.} = 1-\exp(-T/(\text{comonomer residence time})) =$ an exponential weighting factor or filter constant (based on comonomer or hydrogen residence time in the reactor)=$1-\exp(-\Delta t/\tau)$, where $\Delta t$=the time step chosen to update the LI calculation (typically=1 minute), $\tau$=the residence time of the raw material (typically either comonomer or hydrogen) that is used to calculate the LI. This residence time is calculated by adding the weight of raw material (i.e. monomer, and comonomer) in the recycle gas stream plus the estimated amount of raw material dissolved in the polymer bed, with the sum being divided by the raw material feedrate.

The value of a leading indicator (LI) or a function of a leading indicator (LI), such as a rescaled value or a reciprocal, is compared to a target value, and at least one reactor parameter is adjusted in response to a deviation between a leading indicator (LI) or the function of a leading indicator (LI) and the target value. Monitoring of this leading indicator permits improved rapid adjustments of reactor parameters to control the properties of polymers that are produced, rapid diagnosis of reactor problems, and the subsequent rapid resolution of reactor problems, compared to using the laboratory analysis of polymer samples alone.

In another embodiment of the invention, a leading indicator (LI) is monitored as a function of time, and the time behavior of a leading indicator (LI) is monitored and compared to a target function.

In another embodiment of our invention, a method of calculating a leading indicator target value ($LI_T$) to control a gas phase polymerization reactor and thereby control the properties of a polymer product produced therein is provided by obtaining a leading indicator (LI) data based on present and past reactor operating parameters, and past analysis of a polymer product produced in the reactor under past leading indicator parameters, and then calculating a new, target leading indicator ($LI_T$) that relates to a desired future polymer product (the future desired polymer product will generally have at least one physical property changed or altered compared to the polymer produced at the present time) wherein the target leading indicator ($LI_T$) is defined as in the following Equations 2a & 3a. Note, for convenience and consistency, the notation of the various components of the calculation is different than earlier presented in Provisional Application 60/512,502 and 60/512,355. Both are shown below with cross reference to the previous version of the calculation/equation (here (2 & 3)): This equation is based on the discovery that the target leading indicator ($LI_T$) to produce a target flow index ($FI_T$) (where Flow Index throughout this document is $I_{21.6}$, as determined by ASTM D1238-01 Procedure B at condition 190/21.6) is a function of the flow index of the higher molecular weight polymer produced by the catalyst system under current reactor parameters ($FI_H$). For example, if the flow index of the higher molecular weight polymer ($FI_H$) increases, then the target leading indicator ($LI_T$) decreases. Or, stated another way, the breadth of the molecular weight distribution affects the relative amount of each component that must be made to achieve the target FI:

$$LI_{target} = (\ln(FI_{target}) - A_1 - C_{CAT1} \times FIHMW, Current) / C_{CAT2}; \quad (2)$$

$$LI_T = (\ln(FI_T) - A_1 - C'_2 \times FIH) / C'_2 \quad (2a)$$

where $A_1 = \ln(FI_{OLD}) - C_{CAT2 \times LIPREVIOUS-SBA} - C_{CAT1 \times FIHMW,old}$ (3)

where $A_1 = \ln(FI_O) - C'_2 \times LIP - C'_1 \times FIHO$ (3a)

where $FI_{target} = FI_T$ is the target flow index of a polymer product that is desired after adjustment of reaction conditions to a new target leading indicator ($LI_T$). $FI_{OLD} = FI_O$ is the measured flow index of polymer produced according to the previous leading indicator reactor conditions; $C_{CAT1} = C'_1$ is a constant related to the catalyst system; $LI_{PREVIOUS-SBA} = LI_P$ is the leading indicator calculated, by a single back average technique (SBA), from the previous time period for the time that the measured flow index of polymer produced according to the previous leading indicator reactor conditions ($FI_O$) and $FI_{HO}$ measurements were performed; and $FI_{HMW,old} = FI_{HO}$ is the flow index of the higher molecular weight polymer measured on polymer produced according to the previous leading indicator conditions. $FI_{HMW,Current} = FI_H$ is the flow index of the higher molecular weight polymer produced by the catalyst system under current reactor parameters. Note that the determination of $FI_H$ is useful in a bi or multimodal molecular weight distribution polymer, i.e. where two or more catalysts are used to produce a polymer having at least one population of molecular weight distributions that are relatively low and at least one distribution that is relatively high. In an alternate embodiment, the flow index of a polymer having low and high (relative) molecular weights can also use the flow index of the lower molecular weight polymer ($FI_L$) for this calculation (2a & 3a). $C_{CAT2} = C'_2$ is a constant related to the catalyst system. $C'_2$ and $C'_2$ are determined for each catalyst system or polymer composition by comparing at least two data points with known leading indicator values (LI) and flow index values (FI) and at least two different flow indexes of the higher molecular weight polymer produced by the catalyst system under current reactor parameters ($FI_H$) and solving algebraically for $C'_1$ and $C'_2$. $C'_1$ and $C'_2$ can vary respectively from 1-10 and 0.1-10, and all elements of these ranges. Likewise, more complicated determinations (generally non-linear) of leading indicators are also contemplated, for instance $C_x$, the $x^{th}$ reactor constant, could be used in conjunction with the square of ($FI_H$) (or in an alternate embodiment using ($FI_L$)).

In another embodiment, which will be most useful when $FI_O$ is near $FI_T$ and a change in $FI_H$ is planned, a method of calculating a leading indicator target ($LI_T$) value to control a polymerization reactor and thereby to control the properties of a polymer product produced therein is contemplated, comprising: a) calculating a leading indicator target ($LI_T$) wherein said leading indicator target ($LI_T$) is determined by:

$$LI_T = LIP + C'_4 + C'_3 \times (FI_H - FIHO);$$

where $C'_3$ and $C'_4$ are constants related to the catalyst system; where $LI_P$ is the leading indicator calculated from the previous time period for the time that the samples upon which $FI_{HO}$ was measured, where $FI_{HO}$ is a flow index of a higher molecular weight portion of said polymer measured on polymer produced according to the previous leading indicator conditions, determined by:

$$FI_{HO} = \ln(-0.33759 + 0.516577 * \ln(I_{21.6}) - 0.01523 * (I_{21.6/I2.16}));$$

where $FI_H$ is a flow index of the higher molecular weight portion of polymer produced by the catalyst system under current reactor parameters, estimated from models showing changes in $FI_H$ based on changes in reaction conditions; and b) changing at least one reactor parameter to adjust the leading indicator toward the new target. $C'_3$ and $C'_4$ may be calculated using data from the relevant catalyst system comparing leading indicators for at least 2 data points where $FI_H$ changes and FI is the same. $C'_3$ may be −0.7, or range from −6.0 to +4.0, or from −0.4 to −1.0, $C'_4$ may be 0, or range from −3.0 to +3.0, or from −0.3 to +0.3.

At least one reactor parameter is adjusted to change the leading indicator toward the new target leading indicator ($LI_T$).

The $FI_H$ model will depend on the exact catalyst system and molecular weight targets. The $FI_H$ model used for the catalyst system in the examples of this patent is:

$$FI_{H=FIHO} + 0.005 \times (COCAT - COCAT_O) + 0.072 \times (C2PP - C2PP_O) + 35.3 \times (H2/C2 - H2/C2_O)$$

Where COCAT and $COCAT_O$ are current and previous, respectively, moving averages of the co-catalyst to ethylene feed ratio in units of parts per million by weight; C2PP and $C2PP_O$ are current and previous, respectively, moving averages of the ethylene partial pressure in bar; and H2/C2 and $H2/C2_O$ are current and previous, respectively, moving averages of the hydrogen to ethylene molar ratio in the cycle gas, dimensionless.

$LI_{PREVIOUS-SBA}=LI_P$ is an exponentially weighted moving average of the LI, calculated with a weighting factor, $\lambda=1-\exp(-\Delta t/(\text{polymer residence time})$ based on the polymer residence time in the reactor.

This calculation is:

$$LI_P=(\lambda \times LI)+(1-\lambda)\times LI_{T-1}$$

In another aspect of the invention, at least two leading indicators are monitored and compared with target values or target functions. For example, a LI based on hydrogen and ethylene may be used in combination with a LI based on hexene and ethylene.

In aspects described herein, suitable reactor components to calculate a LI include, for example, hydrogen, monomers, comonomers, or any tracer component that is preferentially incorporated into one portion of the polymer composition distribution. Suitable reactor parameters to control LI include, for example, monomer feed rate, comonomer feed rates, catalyst feed rates, cocatalyst feed rates, hydrogen feed rate, reactor temperature, monomer partial pressure, comonomer partial pressure, hydrogen partial pressure, water feed rate, carbon dioxide feed rate, impurity feedrate, condensing agent feedrate, isopropyl alcohol feedrate, oxygen feedrate, and combinations thereof.

In another aspect of the invention, a method of achieving control of a leading indicator LI is provided and generally comprises choosing at least one process sensitive parameter for manipulating to control a leading indicator function LI, and, manipulating the process sensitive parameter using changes in the values of that process sensitive parameter to control a leading indicator (LI).

In another embodiment of the invention, a filter is applied to provide a true, noise-free leading indicator LI for stable automatic control before performing the changes in the values of that process parameter. The filtering technique is described in "*Introduction to Control Theory with Applications to Process Control*" [Lowell B. Koppel, Prentice-Hall, 1968, Appendix E.]

In another aspect of the invention, the polymerization is catalyzed by a catalyst system including a first catalyst producing a first polymer and a second catalyst producing a second polymer, and the method produces a polymer product having a distribution of molecular weight, composition, or both molecular weight and composition, that is broad or bimodal or both broad or bimodal. Throughout this description, bimodal means at least two molecular weight and/or composition distributions, which may also include "multimodal" which means three, four, five, six, seven or more molecular weight and/or composition distributions. The reactor parameter can be chosen to selectively alter the relative activity of the first and second catalysts or the relative feedrates of the two catalysts, provide control over the bimodal distribution or distributions, or both.

In another embodiment of the invention the polymerization is carried out using supported bimetallic catalysts where at least one catalyst is a Ziegler-Natta based catalyst.

In another embodiment of the invention the polymerization is carried out using supported bimetallic catalysts where at least one catalyst is a metallocene based catalyst.

In another aspect of the invention, the polymerization is carried out using supported bimetallic catalysts where at least one catalyst is at least one metallocene catalyst-based compound and/or at least one other metal containing catalyst such as a "Ziegler-Natta" type catalyst as would be known in the art.

In another aspect of the invention the polymerization is carried out using supported bimetallic catalysts where one component of the catalyst is a metallocene compound, $Cp_2MX_2$, wherein Cp is a substituted cyclopentadienyl ring, M is a Group 4 metal, and X is a halide. In another embodiment wherein the at least one metallocene catalyst compound is $(RCp)_2MX_2$, wherein Cp is a substituted cyclopentadienyl ring, M is zirconium; R is an n-butyl, and X is fluoride.

The feed rates in Equation (1a) can be in any convenient units, as the units will cancel. Mole fractions are dimensionless, and thus the leading indicator is also dimensionless. It should be appreciated that use of leading indicators as described herein is based on relative, not absolute quantities. One or more leading indicators is monitored as a function of time, and changes in the one or more leading indicator(s) are used as described below to monitor and/or control the reaction. Thus, functions of Equation (1a) or variations thereof are also within the scope of embodiments of the invention. For example, the reciprocal of a leading indicator is still a leading indicator, and other functions can be applied to the numerator, denominator or the ratios or averages as desired or required depending on the monomers being polymerized and the conditions of the reaction, provided that the function thus obtained permits monitoring and/or controlling the reactor changes over a period of time.

The numerator in Equation (1a) can relate to any quantity to which one or both of the catalyst components is sensitive, such as, for example hydrogen gas concentration or the gas-phase concentration of a comonomer. The terms "numerator" and "denominator" are used only for convenience, as the reciprocal of a leading indicator is itself a leading indicator.

In one embodiment, the leading indicator is based on the relative amounts of hydrogen gas ($H_2$) and ethylene monomer, the ethylene monomer being denoted "$C_2$" for convenience. In this embodiment, the leading indicator is referred to as the "$H_2$ leading indicator".

In another embodiment, the leading indicator is based on the relative amounts of a comonomer (CM) and the major monomer (M), i.e., the method produces copolymers having a majority of polymerized monomer units and a minority of polymerized comonomer units.

In another embodiment, the leading indicator is based on ethylene as the (major) monomer and the comonomer is selected from the group consisting of $C_3$-$C_{12}$ alpha-olefins, hydrogen and mixtures thereof.

In another embodiment, the leading indicator is based on ethylene as the (major) monomer and the comonomer is selected from the group consisting of $C_3$-$C_8$ alpha-olefins, hydrogen and mixtures thereof.

In another embodiment, the leading indicator is based on ethylene as the (major) monomer and the comonomer is selected from the group consisting of $C_3$-$C_6$ alpha-olefins, hydrogen and mixtures thereof.

In another embodiment, the olefin polymerization is catalyzed by a catalyst system comprising a first catalyst producing a first polymer and a second catalyst producing a second polymer, and wherein the method produces a polymer product having a distribution of molecular weight and composition that is broad and bimodal.

In another embodiment, the step of adjusting at least one reactor parameter is effective to alter the relative productivity of the first and/or second catalysts.

In another embodiment, the catalyst system comprises at least one metallocene catalyst and at least one non-metallocene catalyst and/or the at least one metallocene and at least one non-metallocene catalysts may be supported and both may be present on the same support or each may be on a separate support.

In another embodiment, the olefin polymerization is catalyzed by a supported bimetallic catalyst system comprising at least one metallocene catalyst and at least one non-metallocene transition metal catalyst, and wherein the method produces a polymer product having a distribution of molecular weight, composition, or both molecular weight and composition, that is broad and/or bimodal. For example, in a copolymer of ethylene monomer and comonomer (1-butene, 1-hexene 1-octene or combinations thereof), the leading indicator is based on the relative amounts of 1-butene, 1-hexene, 1-octene or combinations thereof as comonomer(s) and ethylene.

In another embodiment, the polymer is a copolymer of ethylene and 1-hexene, or ethylene and 1-butene and the leading indicator is based on the relative amounts of 1-hexene (or 1-butene) comonomer(s) and ethylene.

Flow rates of various components can be measured using conventional flow meters or Coriolis Flow Meters. The gas phase concentration of components can be determined by analysis of the recycle gas stream with gas analyzer 38 (FIG. 1).

If desired, one or more leading indicators can be determined as a function of time.

In another embodiment, LI is monitored as a function of time, and the time behavior of LI is monitored and compared to a target function. The leading indicator can be determined at a plurality of times. The time interval between determinations of LI can be any convenient interval. It is convenient to determine LI at regular intervals, such as every minute, every 5 minutes, or other larger or smaller time interval, although the time intervals can also be random.

In another embodiment, at least two leading indicators are monitored and compared with target values or target functions. In an embodiment, the $H_2$ leading indicator and a comonomer leading indicator (e.g. based on 1-octene, 1-hexene or 1-butene as comonomer) are used.

Fluidized-Bed Reactor

Fluidized-bed reactors are well-known in the art; an example of a fluidized bed reactor is described herein, for illustrative purposes only. Those skilled in the art will recognize that the numerous modifications and enhancements can be made, as desired, to the fluidized-bed reactor.

The catalyst used is not particularly limited, and can include, for example, one or more Ziegler-Natta catalysts and/or metallocene catalysts. Mixtures of catalysts can also be used. In particular, polymerization can be carried out with two or more different catalysts present and actively polymerizing at the same time, in a single reactor. The two or more catalysts can be of different catalyst types, such as a non-metallocene catalyst and a metallocene catalyst, to produce a product resin having desirable properties. The catalysts can be fed to the reactor separately or as a physical mixture, or each catalyst particle can contain more than one catalyst compound. When the catalyst include two active catalyst sites producing polymers of different molecular weight and/or different comonomer content, the polymer product can have a bimodal distribution of molecular weight, comonomer, or both. Such bimodal products can have physical properties that are different from those that can be obtained from either catalyst alone, or from post-reactor mixing of the individual unimodal resins obtained from each catalyst alone.

FIG. 1 illustrates a gas-phase fluidized bed reactor 20 useful in performing the method of the present invention. The reactor 20 has a reactor body 22, which is generally an upright cylinder having a fluidization grid 24 located in its lower regions. The reactor body 22 encloses a fluidized bed zone 26 and a velocity reduction zone 28, which is generally of increased diameter compared to the diameter of the fluidized bed zone 26 of the reactor body 22.

The gaseous reaction mixture leaving the top of the reactor body 22, termed the "recycle gas stream," contains principally unreacted monomer, unreacted hydrogen gas, inert condensable gases such as isopentane, and inert non-condensable gases such as nitrogen. The recycle gas stream is transferred via line 30 to compressor 32, and from compressor 32 to heat exchanger 34. An optional cyclone separator 36 may be used as shown, upstream of compressor 32, to remove fines, if desired. A gas analyzer 38 can be used to sample the recycle gas stream to determine concentrations of various components. Typically, the gas analyzer is a gas phase chromatograph (GPC), or a spectrograph such as a near-infrared spectrometer or a Fourier transform near-infrared spectrometer (FT-NIR). An additional heat exchanger (not shown) may also be used if desired, and may be located upstream of compressor 32.

The cooled recycle gas stream exits the heat exchanger 34 via line 40. As discussed above, the cooled recycle gas stream can be gaseous, or can be a mixture of gaseous and liquid phases. FIG. 1 shows an optional configuration wherein at least a portion of the recycle gas stream is cooled to a temperature at or below the temperature where liquid condensate begins to form (the dew point). All or a portion of the resultant gas liquid mixture is transferred via line 40 to a separator 42, where all or a portion of the liquid is removed. All or a portion of the gas stream, which may contain some liquid, is transferred via line 44 to a point below the fluidization grid 24 in the lower region of the reactor. An amount of upwardly flowing as, sufficient to maintain the bed in a fluidized condition, is provided in this way.

Those skilled in the art will understand that less gas is required to maintain fluidization when the reactor employed is a stirred bed reactor.

An optional compressor 46 may be provided to ensure that a sufficient velocity is imparted to the gases flowing through line 44 into the bottom of the reactor. The gas stream entering the bottom of the reactor may contain condensed liquid, if desired.

All or a portion of the liquid phase separated from the recycle stream in separator 42 is transferred via line 48 to a manifold 50 located at or near the top of the reactor. If desired, a pump 52 may be provided in line 48 to facilitate the transfer of liquid to manifold 50. The liquid entering manifold 50 flows downward into manifold 54 through a plurality of conduits 56 which have good heat exchange properties and which are in heat exchange contact with the wall of the reactor. The passage of liquid through the conduits 56 cools the interior wall of the reactor and warms the liquid to a greater or lesser extent, depending upon the temperature differential and the duration and extent of heat exchange contact. Thus by the time the liquid entering manifold 50 reaches manifold 54, it has become a heated fluid which may have remained in an entirely liquid state or it may have become partially or totally vaporized.

As shown in FIG. 1, the heated fluid (gas and/or liquid) is passed from manifold 54 via line 58 to combine with gases leaving the separator 42 via line 44, prior to entry into the reactor in the region below the fluidization grid 24. In like manner, make-up monomer can be introduced into the reactor in either liquid or gaseous form via line 60. Gas and/or liquid collected in manifold 54 may also be transferred directly into the reactor (not shown) in the region below the fluidization grid.

Product polymer particles can be removed from the reactor via line 62 in the conventional way, as for example by the method and apparatus described in U.S. Pat. No. 4,621,952.

Catalyst is continuously or intermittently injected into the reactor using a catalyst feeder (not shown) such as the device disclosed in U.S. Pat. No. 3,779,712. The catalyst may be fed into the reactor at a point 20 to 40 percent of the reactor diameter away from the reactor wall and at a height of about 5 to about 30 percent of the height of the bed. Suitable catalysts are described below.

A gas, which is inert to the catalyst, such as nitrogen or argon, may be used to carry catalyst into the bed. Cold condensed liquid from either separator 42 or from manifold 54 may also be used to transport catalyst into the bed.

In methods of the present invention, the fluidized bed reactor is operated to form polyolefins having a bimodal molecular weight distribution, a bimodal comonomer distribution, or both. Suitable polyolefins include, but are not limited to, polyethylene(s), polypropylene, polyisobutylene, and copolymers thereof.

In one embodiment, at least one polyolefin includes polyethylene copolymers. Low density polyethylene ("LDPE") can be prepared at high pressure using free radical initiators, or in gas phase processes using Ziegler-Natta or vanadium catalysts, and typically has a density in the range of 0.916-0.928 g/cm$^3$. LDPE is also known as "branched" or "heterogeneously branched" polyethylene because of the relatively large number of long chain branches extending from the main polymer backbone. Polyethylene with the same density range, i.e., 0.916 to 0.928 g/cm$^3$, which is linear and does not contain long chain branching is also known; this "linear low density polyethylene" ("LLDPE") can be produced with conventional Ziegler-Natta catalysts or with metallocene catalysts. Relatively higher density LDPE, typically in the range of 0.928 to 0.940 g/cm$^3$, is sometimes referred to as medium density polyethylene ("MDPE"). Polyethylenes having still greater density are the high density polyethylenes ("HDPEs"), i.e., polyethylenes having densities greater than 0.940 g/cm$^3$, and are generally prepared with Ziegler-Natta catalysts. Very low density polyethylene ("VLDPE") is also known. VLDPEs can be produced by a number of different processes yielding polymers with different properties, but can be generally described as polyethylenes having a density less than 0.916 g/cm$^3$, typically 0.890 to 0.915 g/cm$^3$ or 0.900 to 0.915 g/cm$^3$.

Polymers having more than two types of monomers, such as terpolymers, are also included within the term "copolymer" as used herein. Suitable comonomers include α-olefins, such as $C_3$-$C_{20}$ α-olefins or $C_3$-$C_{12}$ α-olefins. The α-olefin comonomer can be linear or branched, and two or more comonomers can be used, if desired. Examples of suitable comonomers include linear $C_3$-$C_{12}$ α-olefins, and α-olefins, and α-olefins having one or more $C_1$-$C_3$ alkyl branches, or an aryl group. Examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Comonomers include propylene, 1-butene, 1-pentene, 4-methyl-1-pentene, 1-hexene, 1-octene and styrene.

Other useful comonomers include polar vinyl, conjugated and non-conjugated dienes, acetylene and aldehyde monomers, which can be included in minor amounts in terpolymer compositions. Non-conjugated dienes useful as co-monomers may be straight chain, hydrocarbon diolefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7octadiene; (c) single ring alicyclic dienes, such as 1,4-cyclohexadiene; 1,5-cyclooctadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. The non-conjugated dienes that may be typically used are dicyclopentadiene, 1,4-hexadiene, 5-methylene-2-norbornene, 5-ethylidene-2-norbornene, and tetracyclo-(Δ-11,12)-5,8-dodecene.

Catalysts

General Definitions

As used herein, the phrase "catalyst system" includes at least one "catalyst component" and at least one "activator", both of which are described further herein. The catalyst system may also include other components, such as supports, and is not limited to the catalyst component and/or activator alone or in combination. The catalyst system may include any number of catalyst components in any combination as described herein, as well as any activator in any combination as described herein.

As used herein, the phrase "catalyst compound" includes any compound that, once appropriately activated, is capable of catalyzing the polymerization or oligomerization of olefins, the catalyst compound comprising at least one Group 3 to Group 12 atom, and optionally at least one leaving group bound thereto.

As used herein, the phrase "leaving group" refers to one or more chemical moieties bound to the metal center of the catalyst component that can be abstracted from the catalyst component by an activator, thus producing the species active towards olefin polymerization or oligomerization. The activator is described further below.

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

As used herein, a "hydrocarbyl" includes aliphatic, cyclic, olefinic, acetylenic and aromatic radicals (i.e., hydrocarbon radicals) comprising hydrogen and carbon that are deficient by one hydrogen. A "hydrocarbylene" is deficient by two hydrogens.

As used herein, an "alkyl" includes linear, branched and cyclic paraffin radicals that are deficient by one hydrogen. Thus, for example, a —$CH_3$ group ("methyl") and a $CH_3CH_2$— group ("ethyl") are examples of alkyls.

As used herein, an "alkenyl" includes linear, branched and cyclic olefin radicals that are deficient by one hydrogen; alkynyl radicals include linear, branched and cyclic acetylene radicals deficient by one hydrogen radical.

As used herein, "aryl" groups includes phenyl, naphthyl, pyridyl and other radicals whose molecules have the ring structure characteristic of benzene, naphthylene, phenanthrene, and anthracene. For example, a $C_6H_5^-$ aromatic structure is an "phenyl", a $C_6H_4^{2-}$ aromatic structure is an "phenylene". An "arylalkyl" group is an alkyl group having an aryl group pendant therefrom, examples of which include benzyl, phenethyl, tolylmethyl; an "alkylaryl" is an aryl group having one or more alkyl groups pendant therefrom, examples of which include tolyl, xylyl, mesityl, and cumyl.

As used herein, an "alkylene" includes linear, branched and cyclic hydrocarbon radicals deficient by two hydrogens. Thus, —$CH_2$— ("methylene") and —$CH_2CH_2$— ("ethylene") are examples of alkylene groups. Other groups deficient by two hydrogen radicals include "arylene" and "alkenylene".

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, and thioethers.

As used herein, "heterocyclic" refers to ring systems having a carbon backbone that comprise from 1 to 3 atoms selected from the group consisting of boron, aluminum, silicon, germanium, nitrogen, phosphorous, oxygen and sulfur, unless the heteroatom (non carbon atom) is described.

As used herein, an "alkylcarboxylate", "arylcarboxylate", and "alkylarylcarboxylate" is an alkyl, aryl, and alkylaryl, respectively, that possesses a carboxyl group in any position. Examples include $C_6H_5CH_2C(O)O^-$, and $CH_3C(O)O^-$.

As used herein, the term "substituted" means that the group following that term possesses at least one moiety in place of one or more hydrogens in any position, the moieties selected from such groups as halogen radicals (esp., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

As used herein, structural formulas are employed as is commonly understood in the chemical arts; lines ("—") used to represent associations between a metal atom ("M", Group 3 to Group 12 atoms) and a ligand, ligand atom or atom (e.g., cyclopentadienyl, nitrogen, oxygen, halogen ions, alkyl), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

A certain stereochemistry for a given structure or part of a structure should not be implied unless so stated for a given structure or apparent by use of commonly used bonding symbols such as by dashed lines and/or heavy lines.

Unless stated otherwise, no embodiment of the present invention is herein limited to the oxidation state of the metal atom "M" as defined below in the individual descriptions and examples that follow. The ligation of the metal atom "M" is such that the compounds described herein are neutral, unless otherwise indicated.

Ziegler-Natta Catalyst Component

The catalyst composition includes a first catalyst component, which may be (or includes) a non-metallocene compound. However, it is contemplated that for certain applications the first catalyst component may alternatively be a metallocene compound, or even one of the metallocene-type catalyst compounds identified below that is different in structure from the second catalyst component as described herein. In an embodiment, the first catalyst component may be a Ziegler-Natta catalyst compound, such as disclosed in ZIEGLER CATALYSTS 363-386 (G. Fink, R. Mulhaupt and H. H. Brintzinger, eds., Springer-Verlag 1995); and in EP 103 120; EP 102 503; EP 0 231 102; EP 0 703 246; RE 33,683; U.S. Pat. No. 4,302,565; U.S. Pat. No. 5,518,973; U.S. Pat. No. 5,525,678; U.S. Pat. No. 5,288,933; U.S. Pat. No. 5,290,745; U.S. Pat. No. 5,093,415 and U.S. Pat. No. 6,562,905. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes), aluminum or boron alkyl and alkyl halides, and inorganic oxide supports.

The Ziegler-Natta catalyst is combined with a support material in one embodiment, either with or without the second catalyst component. The first catalyst component can be combined with, placed on or otherwise affixed to a support in a variety of ways. In one of those ways, a slurry of the support in a suitable non-polar hydrocarbon diluent is contacted with an organomagnesium compound, which then dissolves in the non-polar hydrocarbon diluent of the slurry to form a solution from which the organomagnesium compound is then deposited onto the carrier. The organomagnesium compound can be represented by the formula RMgR', where R' and R are the same or different $C_2$-$C_{12}$ alkyl groups, or $C_4$-$C_{10}$ alkyl groups, or $C_4$-$C_8$ alkyl groups. In at least one embodiment, the organomagnesium compound is dibutyl magnesium. In one embodiment, the amount of organomagnesium compound included in the silica slurry is only that which will be deposited, physically or chemically, onto the support, for example, being bound to the hydroxyl groups on the support, and no more than that amount, since any excess organomagnesium compound may cause undesirable side reactions. Routine experimentation can be used to determine the optimum amount of organomagnesium compound. For example, the organomagnesium compound can be added to the slurry while stirring the slurry, until the organomagnesium compound is detected in the support solvent. Alternatively, the organomagnesium compound can be added in excess of the amount that is deposited onto the support, in which case any undeposited excess amount can be removed by filtration and washing. The amount of organomagnesium compound (moles) based on the amount of dehydrated silica (grams) generally range from 0.2 mmol/g to 2 mmol/g in an embodiment.

In one embodiment the Ziegler-Natta catalyst, optionally including the organomagnesium compound, is contacted with an electron donor, such as tetraethylorthosilicate (TEOS) or an organic alcohol having the formula R"OH, where R" is a $C_1$-$C_{12}$ alkyl group, or a $C_1$ to $C_8$ alkyl group, or a $C_2$ to $C_4$ alkyl group, and/or an ether or cyclic ether such as tetrahydrofuran. In an embodiment, R"OH is n-butanol. The amount of organic alcohol is used in an amount effective to provide an R"OH:Mg mol/mol ratio of from 0.2 to 1.5, or from 0.4 to 1.2, or from 0.6 to 1.1, or from 0.9 to 1.0.

The organomagnesium and alcohol-treated slurry is contacted with a non-metallocene transition metal compound. Suitable non-metallocene transition metal compounds are compounds of Group 4, 5 and 6 metals that are soluble in the non-polar hydrocarbon used to form the silica slurry in an embodiment. Non-limiting examples of suitable Group 4, 5 or 6 transition metal compounds include, for example, titanium and vanadium halides, oxyhalides or alkoxyhalides, such as titanium tetrachloride ($TiCl_4$), vanadium tetrachloride ($VCl_4$) and vanadium oxytrichloride ($VOCl_3$), and titanium and vanadium alkoxides, wherein the alkoxide moiety has a branched or unbranched alkyl group of 1 to 20 carbon atoms, or 1 to 6 carbon atoms. Mixtures of such transition metal compounds may also be used. The amount of non-metallocene transition metal compound used is sufficient to give a transition metal to magnesium mol/mol ratio of from 0.3 to 1.5, or from 0.5 to 0.8. The diluent can then be removed in a conventional manner, such as by evaporation or filtering, to obtain the dry, supported first catalyst component.

The first and second catalyst components may be contacted with the support in any order. In an embodiment of the invention, the first catalyst component is reacted first with the support as described above, followed by contacting this supported first catalyst component with a second catalyst component.

Metallocene Catalyst Component

The catalyst system useful in the present invention includes at least one metallocene catalyst component as described herein. Metallocene catalyst compounds are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243-296 (1999) and in particular, for use in the synthesis of polyethylene in 1 METALLOCENE-BASED POLYOLEFINS 261-377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components". The metallocene catalyst component is supported on a support material in an embodiment as described further below, and may be supported with or without another catalyst component.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, and the atoms that make up the Cp ligands are selected from the group consisting of carbon, nitrogen, oxygen, silicon, sulfur, phosphorus, germanium, boron and aluminum and combinations thereof, wherein carbon makes up at least 50% of the ring members. Or, the Cp ligand(s) are selected from the group consisting of substituted and unsubstituted cyclopentadienyl ligands, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$Ind"), substituted versions thereof (as described in more detail below), and heterocyclic versions thereof.

The metal atom "M" of the metallocene catalyst compound, as described throughout the specification and claims, may be selected from the group consisting of Groups 3 through 12 atoms and lanthanide Group atoms in one embodiment; and selected from the group consisting of Groups 3 through 10 atoms in another embodiment, and selected from the group consisting of Sc, Ti, Zr, Hf, V, Nb, Ta, Mn, Re, Fe, Ru, Os, Co, Rh, Ir, and Ni in another embodiment; and selected from the group consisting of Groups 4, 5 and 6 atoms in another embodiment, and Ti, Zr, Hf atoms in another embodiment, and Zr in another embodiment. The oxidation state of the metal atom "M" may range from 0 to +7 in one embodiment; and in another embodiment, is +1, +2, +3, +4 or +5; and in another embodiment is +2, +3 or +4. The groups bound the metal atom "M" are such that the compounds described below in the formulas and structures are electrically neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

In one aspect of the invention, the one or more metallocene catalyst components of the invention are represented by the formula (I):

$$Cp^A Cp^B MX_n \tag{I}$$

wherein M is as described above; each X is chemically bonded to M; each Cp group is chemically bonded to M; and n is 0 or an integer from 1 to 4, and either 1 or 2 in an embodiment.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in structure (I) as well as ring substituents in structures (Va-d (herein below)) include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

Other non-limiting examples of alkyl substituents R associated with formula (I) through (V) include methyl, ethyl, propyl, butyl, pentyl, hexyl, cyclopentyl, cyclohexyl, benzyl, phenyl, methylphenyl, and tert-butylphenyl groups, including all their isomers, for example tertiary-butyl, and isopropyl. Other possible radicals include substituted alkyls and aryls such as, for example, fluoromethyl, fluroethyl, difluroethyl, iodopropyl, bromohexyl, chlorobenzyl and hydrocarbyl substituted organometalloid radicals including trimethylsilyl, trimethylgermyl, and methyldiethylsilyl; and halocarbyl-substituted organometalloid radicals including tris(trifluoromethyl)silyl, methylbis(difluoromethyl)silyl, and bromomethyldimethylgermyl; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, and 5-hexenyl. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each X in the formula (I) above and for the formulas/structures (II) through (V) below is independently selected from the group consisting of: any leaving group in one embodiment; halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in another embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in another embodiment; hydride, chloride, fluoride, methyl, phenyl, phenoxy, benzoxy, tosyl, fluoromethyls and fluorophenyls in another embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in another embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in another embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in another embodiment; and fluoride in another embodiment.

Other non-limiting examples of X groups in formula (I) include amines, amido compounds, phosphines, ethers, carboxylates, dienes, hydrocarbon radicals having from 1 to 20 carbon atoms, fluorinated hydrocarbon radicals (e.g., $-C_6F_5$ (pentafluorophenyl)), fluorinated alkylcarboxylates (e.g., $CF_3C(O)O^-$), hydrides and halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, and dimethylphosphide radicals. In one embodiment, two or more X's form a part of a fused ring or ring system.

In another aspect of the invention, the metallocene catalyst component includes those of formula (I) where $Cp^A$ and $Cp^B$ are bridged to each other by at least one bridging group, (A), such that the structure is represented by formula (II):

$$Cp^A(A)Cp^B MX_n \qquad (II)$$

These bridged compounds represented by formula (II) are known as "bridged metallocenes". $Cp^A$, $Cp^B$, M, X and n in structure (II) are as defined above for formula (I); and wherein each Cp ligand is chemically bonded to M, and (A) is chemically bonded to each Cp. Non-limiting examples of bridging group (A) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above (for formula (I)) including halogen radicals and iron. Other non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $-Si(R')_2Si(R'_2\#$, $R'_2Ge=$, $R'P=$ (wherein "$=$" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In another embodiment, bridging group (A) may also be cyclic, comprising, for example 4 to 10, 5 to 7 ring members in another embodiment. The ring members may be selected from the elements mentioned above, from one or more of B, C, Si, Ge, N and O in another embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents are selected from the group consisting of hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group consisting of those having 4 to 10, or 5, 6 or 7 ring members (selected from the group consisting of C, N, O and S in another embodiment), for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (including in some embodiments, alkyl) groups and halogen atoms.

The ligands $Cp^A$ and $Cp^B$ of formulae (I) and (II) are different from each other in one embodiment, and the same in another embodiment.

In yet another aspect of the invention, the metallocene catalyst components include bridged mono-ligand metallocene compounds (e.g., mono cyclopentadienyl catalyst components). In this embodiment, the at least one metallocene catalyst component is a bridged "half-sandwich" metallocene as in, for example, U.S. Pat. No. 5,055,438, represented by the formula (III):

wherein $Cp^A$ is defined above and is bound to M; (A) is a bridging group bonded to Q and $Cp^A$; and wherein an atom from the Q group is bonded to M; and n is 0 or an integer from 1 to 3; 1 or 2 in another embodiment. In formula (III) above, $Cp^A$, (A) and Q may form a fused ring system. The X groups and n of formula (III) are as defined above in formula (I) and (II). In one embodiment, $Cp^A$ is selected from the group consisting of cyclopentadienyl, indenyl, tetrahydroindenyl, fluorenyl, substituted versions thereof, and combinations thereof.

In formula (III), Q is a heteroatom-containing ligand in which the bonding atom (the atom that is bonded with the metal M) is selected from the group consisting of Group 15 atoms and Group 16 atoms in one embodiment, and selected from the group consisting of nitrogen, phosphorus, oxygen or sulfur atom in another embodiment, and nitrogen and oxygen in another embodiment. Non-limiting examples of Q groups include alkylamines, arylamines, mercapto compounds, ethoxy compounds, carboxylates (e.g., pivalate), carbamates, azenyl, azulene, pentalene, phosphoyl, phosphinimine, pyrrolyl, pyrozolyl, carbazolyl, borabenzene other compounds comprising Group 15 and Group 16 atoms capable of bonding with M.

In yet another aspect of the invention, the at least one metallocene catalyst component is an unbridged "half sandwich" metallocene represented by the formula (IVa):

wherein $Cp^A$ is defined as for the Cp groups in (I) and is a ligand that is bonded to M; each Q is independently bonded to M; Q is also bound to $Cp^A$ in one embodiment; X is a leaving group as described above in (I); n ranges from 0 to 3, and is 1 or 2 in one embodiment; q ranges from 0 to 3, and is 1 or 2 in one embodiment. In one embodiment, $Cp^A$ is selected from the group consisting of cyclopentadienyl, indenyl, tetrahydroindenyl, fluorenyl, substituted version thereof, and combinations thereof.

In formula (IVa), Q is selected from the group consisting of ROO⁻, RO—, R(O)—, —NR—, —CR₂—, —S—, —NR₂, —CR₃, —SR, —SiR₃, —PR₂, —H, and substituted and unsubstituted aryl groups, wherein R is selected from the group consisting of $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, and $C_6$ to $C_{12}$ aryloxys. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (IVb), such as described in, for example, U.S. Pat. No. 6,069,213:

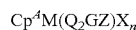

or

wherein M, $Cp^A$, X and n are as defined above;

$Q_2GZ$ forms a polydentate ligand unit (e.g., pivalate), wherein at least one of the Q groups form a bond with M, and is defined such that each Q is independently selected from the group consisting of —O—, —NR—, —CR₂— and —S—; G is either carbon or silicon; and Z is selected from the group consisting of R, —OR, —NR₂, —CR₃, —SR, —SiR₃, —PR₂, and hydride, providing that when Q is —NR—, then Z is selected from the group consisting of —OR, —NR₂, —SR, —SiR₃, —PR₂; and provided that neutral valency for Q is satisfied by Z; and wherein each R is independently selected from the group consisting of $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys;

n is 1 or 2 in an embodiment; and

T is a bridging group selected from the group consisting of $C_1$, to $C_{10}$ alkylenes, $C_6$ to $C_{12}$ arylenes and $C_1$ to $C_{10}$ heteroatom containing groups, and $C_6$ to $C_{12}$ heterocyclic groups;

wherein each T group bridges adjacent "$Cp^AM(Q_2GZ)X_n$" groups, and is chemically bonded to the $Cp^A$ groups.

In formula (IVb), m is an integer from 1 to 7; m is an integer from 2 to 6 in another embodiment.

In another aspect of the invention, the at least one metallocene catalyst component can be described more in structures (Va), (Vb), (Vc), (Vd) (Ve) and (Vf):

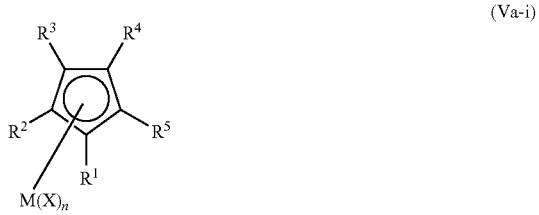

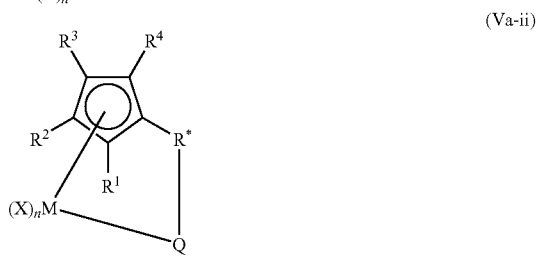

-continued

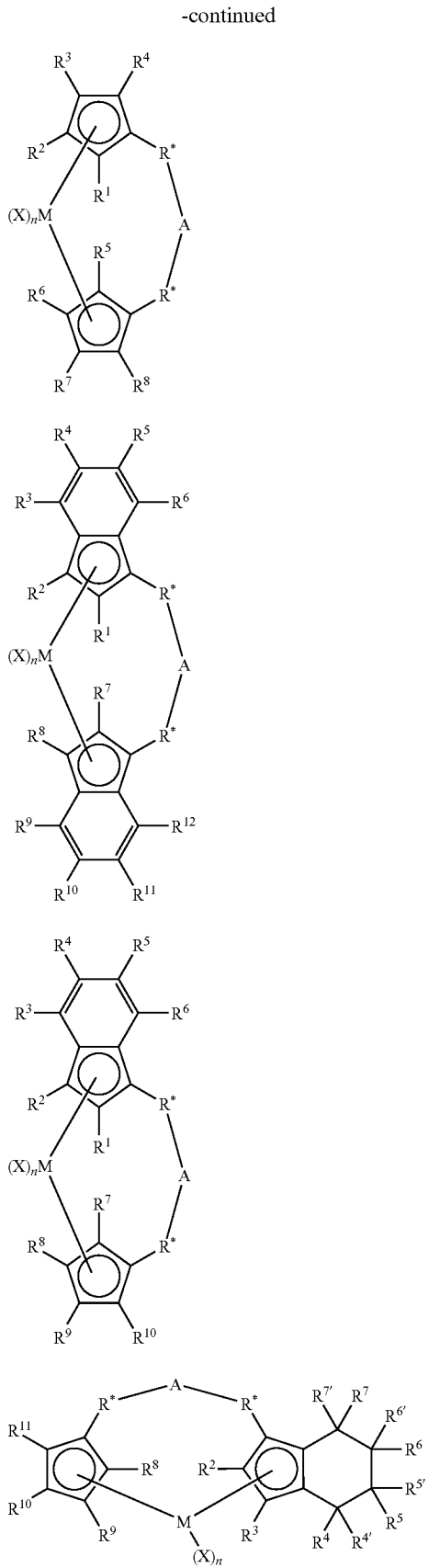

(Vb)

(Vc)

(Vd)

(Ve)

-continued

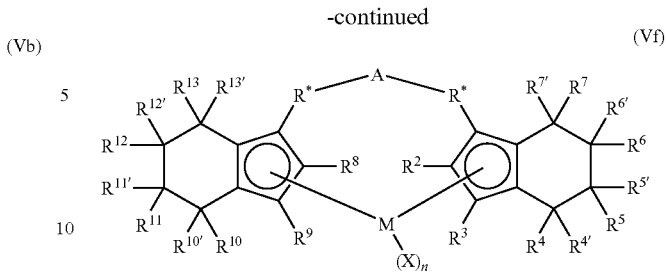

(Vf)

wherein in structures (Va) to (Vf) M is selected from the group consisting of Group 3 to Group 12 atoms, and selected from the group consisting of Group 3 to Group 10 atoms in another embodiment, and selected from the group consisting of Group 3 to Group 6 atoms in another embodiment, and selected from the group consisting of Group 4 atoms in another embodiment, and selected from the group consisting of Zr and Hf in another embodiment; and is Zr in another embodiment;

wherein Q in (Va-ii) is selected from the group consisting of alkylenes, aryls, arylenes, alkoxys, aryloxys, amines, arylamines (e.g., pyridyl) alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorinated alkyls, fluorinated aryls, and fluorinated alkylcarboxylates; wherein the saturated groups defining Q comprise from 1 to 20 carbon atoms in one embodiment; and wherein the aromatic groups comprise from 5 to 20 carbon atoms in one embodiment; wherein each R* is independently: selected from the group consisting of hydrocarbylenes and heteroatom-containing hydrocarbylenes in one embodiment; and selected from the group consisting of alkylenes, substituted alkylenes and heteroatom-containing hydrocarbylenes in another embodiment; and selected from the group consisting of $C_1$ to $C_{12}$ alkylenes, $C_1$ to $C_{12}$ substituted alkylenes, and $C_1$ to $C_{12}$ heteroatom-containing hydrocarbylenes in another embodiment; and selected from the group consisting of $C_1$ to $C_4$ alkylenes in another embodiment; and wherein both R* groups are identical in another embodiment in structures (Vb-f);

A is as described above for (A) in structure (II), and selected from the group consisting of a chemical bond, —O—, —S—, —SO$_2$—, —NR—, =SiR$_2$, =GeR$_2$, =SnR$_2$, —R$_2$SiSiR$_2$—, RP=, $C_1$ to $C_{12}$ alkylenes, substituted $C_1$ to $C_{12}$ alkylenes, divalent $C_4$ to $C_{12}$ cyclic hydrocarbons and substituted and unsubstituted aryl groups in one embodiment; and selected from the group consisting of $C_5$ to $C_8$ cyclic hydrocarbons, —CH$_2$CH$_2$—, =CR$_2$ and =SiR$_2$ in another embodiment; wherein and R is selected from the group consisting of alkyls, cycloalkyls, aryls, alkoxys, fluoroalkyls and heteroatom-containing hydrocarbons in one embodiment; and R is selected from the group consisting of $C_1$ to $C_6$ alkyls, substituted phenyls, phenyl, and $C_1$ to $C_6$ alkoxys in another embodiment; and R is selected from the group consisting of methoxy, methyl, phenoxy, and phenyl in another embodiment;

wherein A may be absent in yet another embodiment, in which case each R* is defined as for $R^1$-$R^{13}$;

each X is as described above in (I);

n is an integer from 0 to 4, and from 1 to 3 in another embodiment, and 1 or 2 in yet another embodiment; and $R^1$ through $R^{13}$ (and $R^{4'}$ through $R^7$ and $R^{10'}$ through $R^{13'}$) are independently: selected from the group consisting of hydrogen radical, halogen radicals, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in one embodiment; selected from the group consisting of hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, $C_7$ to $C_{18}$ fluoroalkylaryls in another embodiment; and hydrogen radical, fluorine radical, chlorine radical, methyl, ethyl, propyl, isopropyl, butyl, isobutyl, tertiary butyl, hexyl, phenyl, 2,6-di-methylpheyl, and 4-tertiarybutylpheyl groups in another embodiment; wherein adjacent R groups may form a ring, either saturated, partially saturated, or completely saturated.

The structure of the metallocene catalyst component represented by (Va) may take on many forms such as disclosed in, for example, U.S. Pat. No. 5,026,798, U.S. Pat. No. 5,703,187, and U.S. Pat. No. 5,747,406, including a dimer or oligomeric structure, such as disclosed in, for example, U.S. Pat. No. 5,026,798 and U.S. Pat. No. 6,069,213.

In an embodiment of the metallocene represented in (Vd), $R^1$ and $R^2$ form a conjugated 6-membered carbon ring system that may or may not be substituted.

Non-limiting examples of metallocene catalyst components consistent with the description herein include:
cyclopentadienylzirconium $X_n$,
indenylzirconium $X_n$,
(1-methylindenyl)zirconium $X_n$,
(2-methylindenyl)zirconium $X_n$,
(1-propylindenyl)zirconium $X_n$,
(2-propylindenyl)zirconium $X_n$,
(1-butylindenyl)zirconium $X_n$,
(2-butylindenyl)zirconium $X_n$,
(methylcyclopentadienyl)zirconium $X_n$,
tetrahydroindenylzirconium $X_n$,
(pentamethylcyclopentadienyl)zirconium $X_n$,
cyclopentadienylzirconium $X_n$,
pentamethylcyclopentadienyltitanium $X_n$,
tetramethylcyclopentyltitanium $X_n$,
1,2,4-trimethylcyclopentadienylzirconium $X_n$,
dimethylsilyl(1,2,3,4-tetramethylcyclopentadienyl)(cyclopentadienyl)zirconium $X_n$, dimethylsilyl(1,2,3,4-tetramethylcyclopentadienyl)(1,2,3-trimethylcyclopentadienyl)zirconium $X_n$,
dimethylsilyl(1,2,3,4-tetramethylcyclopentadienyl)(1,2-dimethylcyclopentadienyl)zirconium $X_n$,
dimethylsilyl(1,2,3,4-tetramethyl-cyclopentadienyl)(2-methylcyclopentadienyl)zirconium $X_n$,
dimethylsilyl(cyclopentadienyl)(indenyl)zirconium $X_n$,
dimethylsilyl(2-methylindenyl)(fluorenyl)zirconium $X_n$,
diphenylsilyl(1,2,3,4-tetramethyl-cyclopentadienyl)(3-propylcyclopentadienyl)zirconium $X_n$,
dimethylsilyl(1,2,3,4-tetramethylcyclopentadienyl)(3-t-butylcyclopentadienyl)zirconium $X_n$,
dimethylgermyl(1,2-dimethylcyclopentadienyl)(3-isopropylcyclopentadienyl)zirconium $X_n$,
dimethylsilyl(1,2,3,4-tetramethyl-cyclopentadienyl)(3-methylcyclopentadienyl) zirconium $X_n$,
diphenylmethylidene(cyclopentadienyl)(9-fluorenyl)zirconium $X_n$,
diphenylmethylidene(cyclopentadienyl)(indenyl)zirconium $X_n$,
iso-propylidenebis(cyclopentadienyl)zirconium $X_n$,
iso-propylidene(cyclopentadienyl)(9-fluorenyl)zirconium $X_n$,
iso-propylidene(3-methylcyclopentadienyl)(9-fluorenyl)zirconium $X_n$,
ethylenebis(9-fluorenyl)zirconium $X_n$,
meso-ethylenebis(1-indenyl)zirconium $X_n$,
ethylenebis(1-indenyl)zirconium $X_n$,
ethylenebis(2-methyl-1-indenyl)zirconium $X_n$,
ethylenebis(2-methyl-4,5,6,7-tetrahydro-1-indenyl)zirconium $X_n$,
ethylenebis(2-propyl-4,5,6,7-tetrahydro-1-indenyl)zirconium $X_n$,
ethylenebis(2-isopropyl-4,5,6,7-tetrahydro-1-indenyl)zirconium $X_n$,
ethylenebis(2-butyl-4,5,6,7-tetrahydro-1-indenyl)zirconium $X_n$,
ethylenebis(2-isobutyl-4,5,6,7-tetrahydro-1-indenyl)zirconium $X_n$,
dimethylsilyl(4,5,6,7-tetrahydro-1-indenyl)zirconium $X_n$,
diphenyl(4,5,6,7-tetrahydro-1-indenyl)zirconium $X_n$,
ethylenebis(4,5,6,7-tetrahydro-1-indenyl)zirconium $X_n$,
dimethylsilylbis(cyclopentadienyl)zirconium $X_n$,
dimethylsilylbis(9-fluorenyl)zirconium $X_n$,
dimethylsilylbis(1-indenyl)zirconium $X_n$,
dimethylsilylbis(2-methylindenyl)zirconiurn $X_n$,
dimethylsilylbis(2-propylindenyl)zirconium $X_n$,
dimethylsilylbis(2-butylindenyl)zirconium $X_n$,
diphenylsilylbis(2-methylindenyl)zirconium $X_n$,
diphenylsilylbis(2-propylindenyl)zirconium $X_n$,
diphenylsilylbis(2-butylindenyl)zirconium $X_n$,
dimethylgermylbis(2-methylindenyl)zirconium $X_n$.
dimethylsilylbis(tetrahydroindenyl)zirconium $X_n$,
dimethylsilylbis(tetramethylcyclopentadienyl)zirconium $X_n$,
dimethylsilyl(cyclopentadienyl)(9-fluorenyl)zirconium $X_n$,
diphenylsilyl(cyclopentadienyl)(9-fluorenyl)zirconium $X_n$,
diphenylsilylbis(indenyl)zirconium $X_n$,
cyclotrimethylenesilyl(tetramethylcyclopentadienyl)(cyclopentadienyl)zirconium $X_n$.
cyclotetramethylenesilyl(tetramethylcyclopentadienyl)(cyclopentadienyl) zirconium $X_n$,
cyclotrimethylenesilyl(tetramethylcyclopentadienyl)(2-methylindenyl)zirconium $X_n$,
cyclotrimethylenesilyl(tetramethylcyclopentadienyl)(3-methylcyclopentadienyl)zirconium $X_n$,
cyclotrimethylenesilylbis(2-methylindenyl)zirconium $X_n$,
cyclotrimethylenesilyl(tetramethylcyclopentadienyl)(2,3,5-trimethylcyclopentadienyl)zirconium $X_n$,
cyclotrimethylenesilylbis(tetramethylcyclopentadienyl)zirconium $X_n$,
dimethylsilyl(tetramethylcyclopentadieneyl)(N-tert-butylamido)titanium $X_n$,
bis(cyclopentadienyl)chromium $X_n$,
bis(cyclopentadienyl)zirconium $X_n$,
bis(n-butylcyclopentadienyl)zirconium $X_n$,
bis(n-dodecyclcyclopentadienyl)zirconium $X_n$,
bis(ethylcyclopentadienyl)zirconium $X_n$,
bis(iso-butylcyclopentadienyl)zirconium $X_n$,
bis(iso-propylcyclopentadienyl)zirconium $X_n$,
bis(methylcyclopentadienyl)zirconium $X_n$,
bis(n-oxtylcyclopentadienyl)zirconium $X_n$,
bis(n-pentylcyclopentadienyl)zirconium $X_n$,
bis(n-propylcyclopentadienyl)zirconium $X_n$,
bis(trimethylsilylcyclopentadienyl)zirconium $X_n$, bis(1,3-bis(trimethylsilyl)cyclopentadienyl)zirconium $X_n$,
bis(1-ethyl-2-methylcyclopentadienyl)zirconium $X_n$,
bis(1-ethyl-3-methylcyclopentadienyl)zirconium $X_n$,
bis(pentamethylcyclopentadienyl)zirconium $X_n$,
bis(pentamethylcyclopentadienyl)zirconium $X_n$,
bis(1-propyl-3-methylcyclopentadienyl)zirconium $X_n$,
bis(1-n-butyl-3-methylcyclopentadienyl)zirconium $X_n$,
bis(1-isobutyl-3-methylcyclopentadienyl)zirconium $X_n$,
bis(1-propyl-3-butylcyclopentadienyl)zirconium $X_n$,
bis(1,3-n-butylcyclopentadienyl)zirconium $X_n$,
bis(4,7-dimethylindenyl)zirconium $X_n$,
bis(indenyl)zirconium $X_n$,
bis(2-methylindenyl)zirconium $X_n$,
cyclopentadienylindenylzirconium $X_n$,
bis(n-propylcyclopentadienyl)haffnium $X_n$,
bis(n-butylcyclopentadienyl)haffnium $X_n$,
bis(n-pentylcyclopentadienyl)haffnium $X_n$,
(n-propyl cyclopentadienyl)(n-butyl cyclopentadienyl) hafnium $X_n$,
bis[(2-trimethylsilylethyl)cyclopentadienyl]hafnium $X_n$,
bis(trimethylsilyl cyclopentadienyl)hafnium $X_n$,
bis(2-n-propylindenyl)hafnium $X_n$,
bis(2-n-butylindenyl)hafnium $X_n$,
dimethylsilylbis(n-propylcyclopentadienyl)hafnium $X_n$,
dimethylsilylbis(n-butylcyclopentadienyl)hafnium $X_n$,
bis(9-n-propylfluorenyl)hafnium $X_n$,
bis(9-n-butylfluorenyl)hafnium $X_n$,
(9-n-propylfluorenyl)(2-n-propylindenyl)hafnium $X_n$,
bis(1-n-propyl-2-methylcyclopentadienyl)hafnium $X_n$,
(n-propylcyclopentadienyl)(1-n-propyl-3-n-butylcyclopentadienyl)hafnium $X_n$,
dimethylsilyl(tetramethylcyclopentadienyl)(cyclopropylamido)titanium $X_n$,
dimethylsilyl(tetramethyleyclopentadienyl)(cyclobutylamido)titanium $X_n$,
dimethylsilyl(tetramethyleyclopentadienyl)(cyclopentylamido)titanium $X_n$,
dimethylsilyl(tetramethylcyclopentadienyl)(cyclohexylamido)titanium $X_n$,
dimethylsilyl(tetramethylcyclopentadienyl)(cycloheptylamido)titanium $X_n$,
dimethylsilyl(tetramethylcyclopentadienyl)(cyclooctylamido)titanium $X_n$,
dimethylsilyl(tetramethylcyclopentadienyl)(cyclononylamido)titanium $X_n$,
dimethylsilyl(tetramethylcyclopentadienyl)(cyclodecylamido)titanium $X_n$,
dimethylsilyl(tetramethylcyclopentadienyl)(cycloundecylamido)titanium $X_n$,
dimethylsilyl(tetramethylcyclopentadienyl)(cyclododecylamido)titanium $X_n$,
dimethylsilyl(tetramethylcyclopentadienyl)(sec-butylamido)titanium $X_n$,
dimethylsilyl(tetramethylcyclopentadienyl)(n-octylamido) titanium $X_n$,
dimethylsilyl(tetramethylcyclopentadienyl)(n-decylamido) titanium $X_n$,
dimethylsilyl(tetramethylcyclopentadienyl)(n-octadecylamido)titanium $X_n$,
methylphenylsilyl(tetramethylcyclopentadienyl)(cyclopropylamido)titanium $X_n$,
methylphenylsilyl(tetramethylcyclopentadienyl)(cyclobutylamido)titanium $X_n$,
methylphenylsilyl(tetramethylcyclopentadienyl)(cyclopentylamido)titanium $X_n$,
methylphenylsilyl(tetramethylcyclopentadienyl)(cyclohexylamido)titanium $X_n$,
methylphenylsilyl(tetramethylcyclopentadienyl)(cycloheptylamido)titanium $X_n$,
methylphenylsilyl(tetramethylcyclopentadienyl)(cyclooctylamido)titanium $X_n$,
methylphenylsilyl(tetramethylcyclopentadienyl)(cyclononylamido)titanium $X_n$,
methylphenylsilyl(tetramethylcyclopentadienyl)(cyclodecylainido)titanium, $X_n$,
methylphenylsilyl(tetramethylcyclopentadienyl)(cycloundecylanido)titanium $X_n$,
methylphenylsilyl(tetramethylcyclopentadienyl)(cyclododecylatido)titanium $X_n$,
methylphenylsilyl(tetramethylcyclopentadienyl)(sec-butylamido)titanium $X_n$,
methylphenylsilyl(tetramethylcyclopentadienyl)(n-octylamido)titanium $X_n$,
methylphenylsilyl(tetramethylcyclopentadienyl)(n-decylamido)titanium $X_n$,
methylphenylsilyl(tetramethylcyclopentadienyl)(n-octadecylamido)titanium $X_n$,
diphenylsilyl(tetramethylcyclopentadienyl)(cyclopropylamido)titanium $X_n$,
diphenylsilyl(tetramethylcyclopentadienyl)(cyclobutylamido)titanium $X_n$,
diphenylsilyl(tetramethylcyclopentadienyl)(cyclopentylamido)titanium $X_n$,
diphenylsilyl(tetramethylcyclopentadienyl)(cyclohexylamido)titanium $X_n$,
diphenylsilyl(tetramethylcyclopentadienyl)(cycloheptylamido)titanium $X_n$,
diphenylsilyl(tetramethylcyclopentadienyl)(cyclooctylamido)titanium $X_n$,
diphenylsilyl(tetramethylcyclopentadienyl)(cyclononylamido)titanium $X_n$,
diphenylsilyl(tetramethylcyclopentadienyl)(cyclodecylamido)titanium $X_n$,
diphenylsilyl(tetramethylcyclopentadienyl)(cycloundecylamido)titanium $X_n$,
diphenylsilyl(tetramethylcyclopentadienyl)(cyclododecylamido)titanium $X_n$,
diphenylsilyl(tetramethylcyclopentadienyl)(sec-butylamido)titanium $X_n$,
diphenylsilyl(tetramethyleyclopentadienyl)(n-octylamido) titanium $X_n$,
diphenylsilyl(tetramethyleyclopentadienyl)(n-decylamido) titanium $X_n$,
diphenylsilyl(tetramethylcyclopentadienyl)(n-octadecylamido)titanium $X_n$, and
derivatives thereof.

By "derivatives thereof", it is meant any substitution or ring formation as described above for structures (Va-f); and replacement of the metal "M" (Cr, Zr, Ti or Hf) with an atom selected from the group consisting of Cr, Zr, Hf and Ti; and replacement of the "X" group with any of $C_1$ to $C_5$ alkyls, $C_6$ aryls, $C_6$ to $C_{10}$ alkylaryls, fluorine or chlorine; n is 1, 2 or 3.

It is contemplated that the metallocene catalyst's components described above include their structural or optical or enantiomeric isomers (racemic mixture), and may be a pure enantiomer in one embodiment.

As used herein, a single, bridged, asymmetrically substituted metallocene catalyst component having a racemic and/or meso isomer does not, itself, constitute at least two different bridged, metallocene catalyst components. In an embodiment, the metallocenes described herein are in their racemic form.

The "metallocene catalyst component" useful in the present invention may comprise any combination of any "embodiment" described herein.

EXAMPLES

In certain embodiments (as described in these Examples) of the invention the catalyst was prepared in the following manner: silica support material, Davison Sylopol® 955 Silica was used. The silicas were dehydrated at a temperature of 875° C. Then, for each sample, a non-metallocene catalyst was combined with the dehydrated silica. That is, for each sample, 500 grams of the respective dehydrated silica were added into a 5-liter, 3-neck round bottom flask enclosed in an $N_2$ glove box. Anhydrous hexane (2500 ml) was then added into the flask, making a silica/hexane slurry. The slurry was heated to a temperature of 54° C. while under constant stirring, and 380 grams of a 15 wt. % solution of dibutyl magnesium was added to the slurry over a period of 20 minutes. The slurry was then allowed to stand for an additional 30 minutes. Butanol (27.4 grams) was diluted to volume with hexane in a 125 ml volumetric flask. The entire 125 ml of diluted butanol solution was added dropwise into the flask containing the slurry, and then the slurry was held at a temperature of 54° C. for 30 minutes while under constant agitation. The amount of butanol may be varied, depending upon the desired concentrations. Titanium tetrachloride (41.0 grams) was diluted to volume with hexane in a 125 ml volumetric flask. The entire 125 ml of diluted titanium tetrachloride solution was then added dropwise into the flask containing the slurry. Following the addition of the solution, the slurry was allowed to stand for about 30 minutes at a temperature of 54° C. The slurry was then allowed to cool to ambient temperature.

The metallocene catalyst compound was then added to the sample of titanium tetrachloride-treated dehydrated silica. First, 673 grams of a 30 wt. % solution of methylaluminoxane (MAO) in toluene was added to a new flask in an $N_2$ glove box. 13.72 grams of the metallocene bis-n-butyl-cyclopentadienyl zirconium difluoride was added into the MAO solution, and the mixture was stirred until all of the solids were dissolved. Next, the MAO/Metallocene mixture was slowly added into the flask containing the previously prepared titanium reaction slurry over a period of one hour. Toluene (50 ml) was used to wash the residual MAO/Metallocene mixture remaining in the flask into the flask containing the reaction slurry. The Al/Zr molar ratio (Al from MAO) may range from 90 to 110; the Ti/Zr molar ratio was 6. Each resulting mixture that included the respective bimetallic catalyst sample was then held at ambient temperature for a period of one hour. Afterward, each mixture was dried using a rotary vaporizer, followed by removing most of the hexanes using a vacuum pressure of 21 mmHg at a temperature of 52° C. The high boiling point toluene was subsequently removed using a vacuum pressure of 28 mmHg at a temperature of 70° C. The final dried bimetallic catalyst appears brown in color as a free flowing solid. Each sample was used in a separate polymerization run in a gas phase reactor, under the conditions identified in the Tables to form a polyethylene polymer composition. This example procedure is capable of being scaled-up by 250 to 1000 times these amounts listed. In each case, addition of water to the reactor was used to stimulate a change in reaction conditions.

Table 1, below, contains the data used in FIG. 2 related to the comparison of hexene leading indicators. Terms are defined in Example 1.

TABLE 1

| Day/Time | $FR_1$ | $GR_1$ | β | LI (Example 1) | Polymer production rate (T/hr) | $WF_{SBA}$ | $LI_{SBA,T}$ (Comparative ex 1) | $LI_{simple}$ (Comparative ex 2) |
|---|---|---|---|---|---|---|---|---|
| Day 1 14:00 | 0.0135 | 0.0070 | 0.021407 | 1.9341 | 29.81 | 0.0070 | 1.937 | 1.940 |
| Day 1 14:08 | 0.0135 | 0.0070 | 0.021559 | 1.9343 | 29.60 | 0.0070 | 1.937 | 1.939 |
| Day 1 14:16 | 0.0135 | 0.0070 | 0.021347 | 1.9348 | 29.90 | 0.0070 | 1.937 | 1.939 |
| Day 1 14:24 | 0.0135 | 0.0070 | 0.020884 | 1.9352 | 30.57 | 0.0070 | 1.937 | 1.938 |
| Day 1 14:32 | 0.0135 | 0.0070 | 0.021626 | 1.9355 | 29.51 | 0.0070 | 1.937 | 1.938 |
| Day 1 14:40 | 0.0135 | 0.0070 | 0.021633 | 1.9357 | 29.50 | 0.0070 | 1.936 | 1.936 |
| Day 1 14:48 | 0.0135 | 0.0070 | 0.021458 | 1.9358 | 29.74 | 0.0070 | 1.936 | 1.932 |
| Day 1 14:56 | 0.0134 | 0.0070 | 0.021661 | 1.9357 | 29.46 | 0.0070 | 1.935 | 1.928 |
| Day 1 15:00 | 0.0134 | 0.0070 | 0.021603 | 1.9356 | 29.54 | 0.0070 | 1.935 | 1.926 |
| Day 1 15:08 | 0.0134 | 0.0070 | 0.021462 | 1.9348 | 29.74 | 0.0071 | 1.934 | 1.922 |
| Day 1 15:16 | 0.0134 | 0.0070 | 0.021553 | 1.9335 | 29.61 | 0.0071 | 1.933 | 1.928 |
| Day 1 15:24 | 0.0135 | 0.0070 | 0.021515 | 1.9318 | 29.66 | 0.0071 | 1.933 | 1.934 |
| Day 1 15:32 | 0.0135 | 0.0070 | 0.021207 | 1.9303 | 30.10 | 0.0071 | 1.933 | 1.939 |
| Day 1 15:40 | 0.0135 | 0.0070 | 0.021591 | 1.9299 | 29.56 | 0.0071 | 1.933 | 1.939 |
| Day 1 15:48 | 0.0135 | 0.0070 | 0.021764 | 1.9304 | 29.32 | 0.0071 | 1.933 | 1.939 |
| Day 1 15:56 | 0.0135 | 0.0070 | 0.021891 | 1.9314 | 29.15 | 0.0071 | 1.933 | 1.939 |
| Day 1 16:00 | 0.0135 | 0.0070 | 0.021637 | 1.9319 | 29.49 | 0.0071 | 1.933 | 1.939 |
| Day 1 16:08 | 0.0135 | 0.0070 | 0.021745 | 1.9328 | 29.35 | 0.0071 | 1.933 | 1.940 |
| Day 1 16:16 | 0.0135 | 0.0070 | 0.021757 | 1.934 | 29.33 | 0.0071 | 1.934 | 1.940 |
| Day 1 16:24 | 0.0135 | 0.0070 | 0.021596 | 1.934 | 29.55 | 0.0071 | 1.934 | 1.939 |
| Day 1 16:32 | 0.0135 | 0.0070 | 0.021835 | 1.935 | 29.22 | 0.0071 | 1.934 | 1.937 |
| Day 1 16:40 | 0.0135 | 0.0070 | 0.021953 | 1.935 | 29.06 | 0.0071 | 1.934 | 1.935 |
| Day 1 16:48 | 0.0135 | 0.0070 | 0.021657 | 1.935 | 29.47 | 0.0071 | 1.933 | 1.933 |
| Day 1 16:56 | 0.0135 | 0.0070 | 0.02167 | 1.935 | 29.45 | 0.0072 | 1.933 | 1.930 |
| Day 1 17:00 | 0.0135 | 0.0070 | 0.021569 | 1.935 | 29.59 | 0.0072 | 1.933 | 1.929 |
| Day 1 17:08 | 0.0135 | 0.0070 | 0.021343 | 1.934 | 29.90 | 0.0072 | 1.932 | 1.927 |
| Day 1 17:16 | 0.0134 | 0.0070 | 0.021389 | 1.933 | 29.84 | 0.0072 | 1.932 | 1.925 |
| Day 1 17:24 | 0.0135 | 0.0070 | 0.021062 | 1.932 | 30.31 | 0.0072 | 1.931 | 1.926 |
| Day 1 17:32 | 0.0135 | 0.0070 | 0.021567 | 1.931 | 29.59 | 0.0072 | 1.931 | 1.928 |
| Day 1 17:40 | 0.0135 | 0.0070 | 0.02146 | 1.930 | 29.74 | 0.0072 | 1.930 | 1.929 |
| Day 1 17:48 | 0.0136 | 0.0070 | 0.021715 | 1.929 | 29.39 | 0.0072 | 1.930 | 1.941 |

TABLE 1-continued

| Day/Time | FR$_1$ | GR$_1$ | β | LI (Example 1) | Polymer production rate (T/hr) | WF$_{SBA}$ | LI$_{SBA,T}$ (Comparative ex 1) | LI$_{simple}$ (Comparative ex 2) |
|---|---|---|---|---|---|---|---|---|
| Day 1 17:56 | 0.0136 | 0.0070 | 0.021357 | 1.929 | 29.88 | 0.0072 | 1.931 | 1.949 |
| Day 1 18:00 | 0.0136 | 0.0070 | 0.021389 | 1.928 | 29.84 | 0.0073 | 1.931 | 1.949 |
| Day 1 18:08 | 0.0136 | 0.0070 | 0.021638 | 1.930 | 29.49 | 0.0073 | 1.932 | 1.949 |
| Day 1 18:16 | 0.0136 | 0.0070 | 0.021428 | 1.932 | 29.78 | 0.0073 | 1.933 | 1.943 |
| Day 1 18:24 | 0.0135 | 0.0070 | 0.021445 | 1.935 | 29.76 | 0.0073 | 1.933 | 1.937 |
| Day 1 18:32 | 0.0136 | 0.0070 | 0.021543 | 1.937 | 29.62 | 0.0073 | 1.933 | 1.941 |
| Day 1 18:40 | 0.0136 | 0.0070 | 0.0212 | 1.939 | 30.11 | 0.0073 | 1.936 | 1.946 |
| Day 1 18:48 | 0.0146 | 0.0070 | 0.021237 | 1.941 | 30.06 | 0.0074 | 1.939 | 2.089 |
| Day 1 18:56 | 0.0151 | 0.0070 | 0.020899 | 1.944 | 30.55 | 0.0074 | 1.953 | 2.159 |
| Day 1 19:00 | 0.0153 | 0.0070 | 0.021514 | 1.945 | 29.66 | 0.0074 | 1.960 | 2.200 |
| Day 1 19:08 | 0.0170 | 0.0070 | 0.020986 | 1.958 | 30.42 | 0.0074 | 1.988 | 2.440 |
| Day 1 19:16 | 0.0170 | 0.0072 | 0.020901 | 1.921 | 30.54 | 0.0074 | 1.946 | 2.358 |
| Day 1 19:24 | 0.0170 | 0.0072 | 0.021378 | 1.978 | 29.85 | 0.0074 | 1.970 | 2.364 |
| Day 1 19:32 | 0.0170 | 0.0076 | 0.021127 | 1.936 | 30.21 | 0.0074 | 1.893 | 2.238 |
| Day 1 19:40 | 0.0170 | 0.0076 | 0.021332 | 1.987 | 29.92 | 0.0075 | 1.916 | 2.239 |
| Day 1 19:48 | 0.0169 | 0.0078 | 0.021159 | 1.957 | 30.17 | 0.0075 | 1.867 | 2.159 |
| Day 1 19:56 | 0.0169 | 0.0081 | 0.021244 | 1.937 | 30.05 | 0.0075 | 1.835 | 2.101 |
| Day 1 20:00 | 0.0169 | 0.0081 | 0.021179 | 1.949 | 30.14 | 0.0075 | 1.841 | 2.097 |
| Day 1 20:08 | 0.0169 | 0.0081 | 0.021732 | 1.968 | 29.36 | 0.0075 | 1.851 | 2.092 |
| Day 1 20:16 | 0.0170 | 0.0081 | 0.021582 | 1.983 | 29.57 | 0.0075 | 1.860 | 2.091 |
| Day 1 20:24 | 0.0169 | 0.0081 | 0.021106 | 1.994 | 30.24 | 0.0076 | 1.869 | 2.084 |
| Day 1 20:32 | 0.0170 | 0.0082 | 0.021624 | 2.003 | 29.51 | 0.0076 | 1.877 | 2.084 |
| Day 1 20:40 | 0.0170 | 0.0082 | 0.021511 | 2.010 | 29.67 | 0.0076 | 1.885 | 2.081 |
| Day 1 20:48 | 0.0170 | 0.0082 | 0.021689 | 2.019 | 29.42 | 0.0076 | 1.895 | 2.082 |
| Day 1 20:56 | 0.0170 | 0.0082 | 0.021601 | 2.028 | 29.54 | 0.0076 | 1.905 | 2.083 |
| Day 1 21:00 | 0.0171 | 0.0082 | 0.021262 | 2.032 | 30.02 | 0.0076 | 1.910 | 2.084 |
| Day 1 21:08 | 0.0171 | 0.0082 | 0.021542 | 2.039 | 29.62 | 0.0076 | 1.920 | 2.085 |
| Day 1 21:16 | 0.0171 | 0.0082 | 0.021459 | 2.045 | 29.74 | 0.0076 | 1.929 | 2.083 |
| Day 1 21:24 | 0.0171 | 0.0082 | 0.021087 | 2.051 | 30.27 | 0.0076 | 1.938 | 2.083 |
| Day 1 21:32 | 0.0169 | 0.0082 | 0.021581 | 2.055 | 29.57 | 0.0077 | 1.945 | 2.066 |
| Day 1 21:40 | 0.0170 | 0.0082 | 0.021759 | 2.059 | 29.33 | 0.0077 | 1.952 | 2.076 |
| Day 1 21:48 | 0.0171 | 0.0082 | 0.02134 | 2.060 | 29.91 | 0.0077 | 1.959 | 2.081 |
| Day 1 21:56 | 0.0171 | 0.0082 | 0.021298 | 2.061 | 29.97 | 0.0077 | 1.966 | 2.080 |
| Day 1 22:00 | 0.0171 | 0.0082 | 0.021969 | 2.062 | 29.04 | 0.0077 | 1.969 | 2.079 |
| Day 1 22:08 | 0.0171 | 0.0082 | 0.02135 | 2.064 | 29.90 | 0.0077 | 1.975 | 2.078 |
| Day 1 22:16 | 0.0171 | 0.0082 | 0.021163 | 2.066 | 30.16 | 0.0077 | 1.981 | 2.085 |
| Day 1 22:24 | 0.0171 | 0.0082 | 0.021309 | 2.067 | 29.95 | 0.0077 | 1.986 | 2.077 |
| Day 1 22:32 | 0.0170 | 0.0082 | 0.021295 | 2.068 | 29.97 | 0.0077 | 1.991 | 2.072 |
| Day 1 22:40 | 0.0170 | 0.0082 | 0.021122 | 2.070 | 30.22 | 0.0077 | 1.995 | 2.070 |
| Day 1 22:48 | 0.0170 | 0.0082 | 0.020904 | 2.070 | 30.54 | 0.0078 | 1.999 | 2.067 |
| Day 1 22:56 | 0.0169 | 0.0082 | 0.021159 | 2.069 | 30.17 | 0.0078 | 2.002 | 2.060 |
| Day 1 23:00 | 0.0169 | 0.0082 | 0.021644 | 2.069 | 29.48 | 0.0078 | 2.004 | 2.060 |
| Day 1 23:08 | 0.0169 | 0.0082 | 0.021259 | 2.069 | 30.02 | 0.0078 | 2.007 | 2.059 |
| Day 1 23:16 | 0.0169 | 0.0082 | 0.021097 | 2.066 | 30.26 | 0.0078 | 2.009 | 2.055 |
| Day 1 23:24 | 0.0169 | 0.0082 | 0.021711 | 2.065 | 29.39 | 0.0078 | 2.011 | 2.054 |
| Day 1 23:32 | 0.0169 | 0.0082 | 0.020931 | 2.063 | 30.50 | 0.0078 | 2.013 | 2.053 |
| Day 1 23:40 | 0.0169 | 0.0082 | 0.020938 | 2.061 | 30.49 | 0.0078 | 2.015 | 2.053 |
| Day 1 23:48 | 0.0169 | 0.0082 | 0.020757 | 2.059 | 30.76 | 0.0078 | 2.017 | 2.053 |
| Day 1 23:56 | 0.0169 | 0.0082 | 0.02118 | 2.057 | 30.14 | 0.0078 | 2.018 | 2.056 |
| Day 2 00:00 | 0.0170 | 0.0082 | 0.021148 | 2.056 | 30.18 | 0.0078 | 2.019 | 2.059 |
| Day 2 00:08 | 0.0170 | 0.0082 | 0.02086 | 2.055 | 30.60 | 0.0078 | 2.021 | 2.064 |
| Day 2 00:16 | 0.0171 | 0.0082 | 0.021048 | 2.054 | 30.33 | 0.0078 | 2.023 | 2.069 |
| Day 2 00:24 | 0.0171 | 0.0083 | 0.020762 | 2.054 | 30.75 | 0.0078 | 2.026 | 2.071 |
| Day 2 00:32 | 0.0171 | 0.0083 | 0.020585 | 2.055 | 31.02 | 0.0078 | 2.028 | 2.072 |
| Day 2 00:40 | 0.0170 | 0.0083 | 0.021164 | 2.057 | 30.16 | 0.0078 | 2.029 | 2.056 |
| Day 2 00:48 | 0.0170 | 0.0083 | 0.021141 | 2.058 | 30.19 | 0.0078 | 2.030 | 2.060 |
| Day 2 00:56 | 0.0170 | 0.0083 | 0.020613 | 2.058 | 30.98 | 0.0078 | 2.031 | 2.063 |
| Day 2 01:00 | 0.0171 | 0.0083 | 0.02084 | 2.057 | 30.63 | 0.0078 | 2.032 | 2.064 |
| Day 2 01:08 | 0.0171 | 0.0083 | 0.020809 | 2.057 | 30.68 | 0.0078 | 2.034 | 2.067 |
| Day 2 01:16 | 0.0171 | 0.0083 | 0.020805 | 2.057 | 30.69 | 0.0078 | 2.035 | 2.066 |
| Day 2 01:24 | 0.0171 | 0.0083 | 0.020742 | 2.057 | 30.78 | 0.0078 | 2.036 | 2.064 |
| Day 2 01:32 | 0.0170 | 0.0083 | 0.021093 | 2.059 | 30.26 | 0.0078 | 2.038 | 2.062 |
| Day 2 01:40 | 0.0171 | 0.0083 | 0.020356 | 2.061 | 31.37 | 0.0078 | 2.041 | 2.064 |
| Day 2 01:48 | 0.0171 | 0.0083 | 0.020753 | 2.063 | 30.76 | 0.0078 | 2.044 | 2.066 |
| Day 2 01:56 | 0.0171 | 0.0083 | 0.02088 | 2.065 | 30.57 | 0.0078 | 2.046 | 2.068 |
| Day 2 02:00 | 0.0171 | 0.0082 | 0.020824 | 2.066 | 30.66 | 0.0078 | 2.048 | 2.069 |
| Day 2 02:08 | 0.0169 | 0.0082 | 0.020742 | 2.067 | 30.78 | 0.0078 | 2.050 | 2.055 |
| Day 2 02:16 | 0.0169 | 0.0082 | 0.02075 | 2.069 | 30.77 | 0.0078 | 2.051 | 2.051 |
| Day 2 02:24 | 0.0170 | 0.0082 | 0.021 | 2.070 | 30.40 | 0.0078 | 2.053 | 2.061 |
| Day 2 02:32 | 0.0171 | 0.0082 | 0.020547 | 2.069 | 31.08 | 0.0078 | 2.055 | 2.075 |
| Day 2 02:40 | 0.0170 | 0.0082 | 0.021241 | 2.068 | 30.05 | 0.0078 | 2.057 | 2.068 |
| Day 2 02:48 | 0.0170 | 0.0082 | 0.020717 | 2.070 | 30.82 | 0.0078 | 2.059 | 2.065 |
| Day 2 02:56 | 0.0169 | 0.0082 | 0.020429 | 2.071 | 31.26 | 0.0078 | 2.060 | 2.062 |
| Day 2 03:00 | 0.0169 | 0.0082 | 0.020788 | 2.072 | 30.71 | 0.0078 | 2.061 | 2.061 |

TABLE 1-continued

| Day/Time | $FR_1$ | $GR_1$ | $\beta$ | LI (Example 1) | Polymer production rate (T/hr) | $WF_{SBA}$ | $LI_{SBA,T}$ (Comparative ex 1) | $LI_{simple}$ (Comparative ex 2) |
|---|---|---|---|---|---|---|---|---|
| Day 2 03:08 | 0.0170 | 0.0082 | 0.020895 | 2.073 | 30.55 | 0.0078 | 2.063 | 2.073 |
| Day 2 03:16 | 0.0170 | 0.0082 | 0.020623 | 2.073 | 30.96 | 0.0078 | 2.065 | 2.070 |
| Day 2 03:24 | 0.0170 | 0.0082 | 0.02042  | 2.074 | 31.27 | 0.0078 | 2.067 | 2.072 |
| Day 2 03:32 | 0.0170 | 0.0082 | 0.021052 | 2.075 | 30.32 | 0.0078 | 2.068 | 2.070 |
| Day 2 03:40 | 0.0170 | 0.0082 | 0.020904 | 2.076 | 30.54 | 0.0078 | 2.070 | 2.074 |
| Day 2 03:48 | 0.0170 | 0.0082 | 0.020865 | 2.077 | 30.60 | 0.0078 | 2.071 | 2.079 |
| Day 2 03:56 | 0.0170 | 0.0082 | 0.020829 | 2.078 | 30.65 | 0.0078 | 2.073 | 2.082 |

All of the following examples were carried out in a commercial-scale fluidized bed reactor, using a catalyst system as described above which includes a metallocene comprising a bis-n-butyl-cyclopentadienyl zirconium difluoride based catalyst and titanium tetrachloride as disclosed above. The polymer production rate was typically 25,000-35,000 kg/hr. The primary monomer was ethylene, and the comonomer was 1-hexene. Gas phase concentrations of $H_2$, ethylene and 1-hexene were measured using a gas chromatograph as the gas analyzer. Flow index, $I_{21.6}$, data were obtained according to ASTM D1238-01 Procedure B at condition 190/21.6. $I_{2.16}$ is determined by ASTM D1238-01 Procedure A at condition 190/2.16. Similar determinations of flow index or other rheological properties, using other testing protocols, such as DIN, are contemplated, using analogous mathematical determinations to those that are outlined herein utilizing ASTM procedures. The use of ASTM procedures is an embodiment of the invention. Flow rates of $H_2$, water, ethylene and 1-hexene were measured using conventional flow meters or Coriolis mass flow meters. $FI_H$ is determined from the formula:

$$FI_H = \ln(-0.33759 + 0.516577 \cdot \ln(I_{21.6}) - 0.01523 \cdot (I_{21.6}/I_{2.16}))$$

This formula was derived from blend studies, where two polymers with known $I_{21.6}$ were blended together and then the combined $I_{21.6}$ and $I_{2.16}$ were measured. The known $I_{21.6}$ of the higher molecular weight component (the $FI_H$ by definition) was correlated with the combined properties to develop the above formula.

EXAMPLE 1

1-Hexene Comonomer Residence Time Exponentially Weighted Moving Average Leading Indicator in a Polymerization A leading indicator calculated using the calculation/equation (shown as LI Example 1 in FIG. 2)

$$LI = \frac{FR_1}{GR_1} = \frac{(\beta)(FR_2) + (1-\beta)(FR_3)}{GR_1} \quad (1a)$$

Where $GR_1$=present value of either of the comonomer/ethylene gas ratio (in this example, the 1-hexene/ethylene ratio is used in this example) or the present value of the hydrogen/ethylene gas ratio at time T (now) in the reactor, as determined by analysis of the recycle stream. In the examples that follow (Comparative Examples 1 & 2, as well as this example, Example 1), the 1-hexene ratio was used for $GR_1$.

Where $FR_1$=the present value of the flow ratio of either of the comonomer/ethylene ratio or the present value of the hydrogen/ethylene ratio expressed as an exponentially weighted moving average (EWMA) at time T. In the examples that follow, as well as this example (Example 1, Comparative Examples 1 & 2), the 1-hexene/ethylene ratio was used for $FR_1$.

Where $FR_2$=the instantaneous Flow Ratio of the 1-hexene/ethylene flow ratio td minutes prior to time step T. In this example, td=18 minutes, which represents the approximate cycle gas analyzer sample transport time and ½ the cycle time of this analyzer.

Where $FR_3$=a EWMA using the comonomer or hydrogen residence time td minutes prior to time step T−1. In the examples that follow, as well as this example (Example 1, Comparative Examples 1 & 2), the 1-hexene/ethylene ratio was used for $FR_3$.

$\beta = 1 - \exp(-T/(\text{comonomer residence time})) =$ an exponential weighting factor or filter constant (based on comonomer or hydrogen residence time in the reactor) (here 1-hexene residence time was used) $= \exp(-\Delta t/\tau)$, where:

$\Delta t$ = the time step chosen to update the LI calculation (typically=1 minute); and $\tau$ = the residence time of the raw material (typically either comonomer or hydrogen) that is used to calculate the LI (again, in this instance, 1-hexene residence time was used); where the leading indicator LI (Example 1) was calculated using the process data in Table 1. The weighting factor $\beta$ was based on 1-hexene residence time in the reactor. The reactor variable that was changed was comonomer (in this case, 1-hexene) flow ratio, FR, which was changed from 0.0135 to 0.0170 at time day 1, 1900 hours. The data in FIG. 2 illustrate the relatively monotonic correlation between the flow index, FI, and the leading indicator. It should be noted that the sawtooth patterns are related to the gas chromatograph analysis technique and are not a part of the mathematical treatment of the data. Ignoring the sawtooth pattern, one can see that the leading indicator (LI Example 1) is consistently moving in the same direction as the flow index, a much better performance than shown by the other two calculation methods.

COMPARATIVE EXAMPLE 1

Polymer Residence Time Exponentially Weighted Moving Average Leading Indicator in a Polymerization The same reactor and materials from Example 1 were used to prepare polymers (again the data is shown in Table 1) but the leading Indicator, LI (comparative Example 1), used to control the reaction was based on a different mathematical model where the process was: (a) determining a flow ratio, FR, by dividing the flow rate of a comonomer, 1-hexene, by the monomer flow rate, ethylene, into the reactor and (b) determining the instantaneous relative gas phase concentration ratio GR of the 1-hexene concentration divided by the monomer (ethylene) concentration, respectively, in a recycle gas stream in the reactor; then defining a single back average (SBA) leading indicator function, $LI_{SBA,T}$ as:

$$LI_{SBA,T} = \frac{(WF_{SBA} \times FR) + (1 - WF_{SBA}) \times SBA_{T-1}}{GR}$$

where $LI_{SBA,T}$ is the Single Back Average leading indicator where the weighting factor WF is based on the average polymer residence time in the reactor at time period T during the reaction; $WF_{SBA}=1-\exp(-T/(\text{polymer residence time}))$.

Where polymer residence time=polymer weight in the reactor/polymer production rate.

FR is the average flow ratio of 1-hexene and ethylene into the reactor; GR is the instantaneous gas phase relative concentration ratio of the 1-hexene and ethylene in the recycle gas stream of the reactor system; $WF_{SBA}$ was the weighting factor that depends on the polymer residence time in the reactor; and $SBA_{T-1}$ is the single back average value during the previous time period.

This leading indicator (LI (comparative Example 1) is shown in FIG. 2, and as can be seen from the figure, it is far slower to react to process changes than the leading indicator of example 1 (LI Example 1).

COMPARATIVE EXAMPLE 2

Simple (Flow Ratio/Gas Ratio) Leading Indicator

FIG. 2 additionally illustrates another LI function, $LI_{simple}$ (comparative example 2), based on simple gas composition ratios and monomer and comonomer flow ratios into the reactor, with no averaging or time delays. This Example is based on the LI as disclosed WO 03/044061. This example illustrates that without proper mathematical weighting, this simple leading indicator value overshoots the predicted flow index values and it can be inferred from these results that a reactor running based on controlling this leading indicator ($LI_{simple}$ (comparative example 2) would produce polymer product having reduced sales value since an appreciable fraction of the product would not meet specification for flow index, FI. The FI specification typically requires FI to be within 20% of the target in order to sell for full sales value.

The leading indicators were determined as a function of time, at 8-minute intervals, over the measured course of the reaction. Table 1 shows the same trend that is evident in the plot in FIG. 2.

The flow index, $I_{21.6}$, and melt index, $I_{2.16}$, were measured at several time points by taking a sample of the polymer product at the corresponding time. The comparative results of the three LI's discussed immediately above in relationship to the flow index, FI of an ethylene-1-hexene copolymer are shown in FIG. 2 in conjunction with the leading indicator data for the three LI's to illustrate the unexpectedly positive behavior of the inventive LI method (LI Example 1) in predicting the FI as compared to the dramatically overshooting result for change in FI for the simple gas flow-monomer concentration LI (LI simple (comparative example 2) and the negative predictive result of the $LI_{SBA,\ T}$ (Comparative example 1) based on polymer residence times on the FI.

In FIG. 2, the changes in leading indicators are evident very soon after the change in comonomer (1-hexene) flow ratio, FR, which was changed from 0.0135 to 0.0170 at time day 1, 1900 hours. But the full change in the flow index of the polymer product is not evident until much later (Day 2, 0000 hours). This illustrates the benefit of using a leading indicator, particularly the inventive leading indicator of Example 1, for reactor control of FI, rather than waiting for measured FI results. Further, the flow index data points are placed at the time the polymer sample was taken. Determination of the flow index in a laboratory actually took approximately an additional 1 to 2 hours. So without the leading indicator, much more off-specification polymer would be produced in the 1 to 2 hours it takes to analyze the flow index samples, then the additional time caused by the process lag after corrective action is taken.

As noted in FIG. 2, the leading indicator based on a weighting factor using comonomer residence time (LI example 1) is far more accurate and predictive than the leading indicator based on the weighting factor using the polymer residence time (LI SBA,T (comparative example 1), which in turn is far more accurate and predictive than the leading indicator using no averaging. LI, simple (comparative example 2) As can be seen from FIG. 2, using the Leading Indicator ($LI_{SBA}$ comparative example 1) results in an indicator that is substantially different and perhaps misleading when compared to the leading indicator (LI Example 1) of embodiments of our invention. The difference between $LI_{SBA}$ (comparative example 1) and the inventive leading indicator (LI example 1) is a difference of averaging technique.

EXAMPLE 3

Impact of a Change in H2/C2 (Hydrogen/Ethylene) Gas Ratio on Leading Indicator Setpoint The following Example relates to gas phase polymerization procedures carried out in a fluidized bed reactor showing the method of calculating a desired leading indicator target ($LI_T$) value to control a gas phase polymerization reactor and thereby control the properties of a polymer product.

TABLE 2

SIMULATED LEADING INDICATOR TARGETS

| Process Time | Sample Time | FI, I21.6 | MI, I2.16 | $FI_T$ | LI | $LI_P$ | H2/C2 mole ratio | H2/C2 mole ratio, SBA | $FI_{HO}$ | LI target comparative example 4 | $FI_H$ | LI target, example 3, with $FI_H$ impact |
|---|---|---|---|---|---|---|---|---|---|---|---|---|
| Day 3 12:00 | | | | 9.000 | 1.77 | 1.76 | 0.0090 | 0.0090 | 0.50 | 1.801 | 0.50 | 1.801 |
| Day 3 10:35 | Day 3 10:35 | 8.13 | 0.086 | 9.000 | 1.77 | 1.75 | 0.0090 | 0.0089 | 0.496 | 1.791 | 0.44 | 1.793 |
| Day 3 09:00 | Day 3 09:00 | 8.62 | 0.082 | 9.000 | 1.75 | 1.77 | 0.0090 | 0.0089 | 0.441 | 1.714 | 0.46 | 1.712 |
| Day 3 06:30 | Day 3 06:30 | 10.20 | 0.095 | 9.000 | 1.77 | 1.78 | 0.0090 | 0.0089 | 0.463 | 1.748 | 0.50 | 1.744 |

TABLE 2-continued

SIMULATED LEADING INDICATOR TARGETS

| Process Time | Sample Time | FI, I21.6 | MI, I2.16 | $FI_T$ | LI | $LI_P$ | H2/C2 mole ratio | H2/C2 mole ratio, SBA | $FI_{HO}$ | LI target comparative example 4 | $FI_H$ | LI target, example 3, with $FI_H$ impact |
|---|---|---|---|---|---|---|---|---|---|---|---|---|
| Day 3 04:05 | Day 3 04:05 | 9.34 | 0.094 | 9.000 | 1.78 | 1.77 | 0.0090 | 0.0089 | 0.497 | 1.730 | 0.51 | 1.731 |
| Day 3 02:25 | Day 3 02:25 | 9.64 | 0.097 | 9.000 | 1.78 | 1.77 | 0.0090 | 0.0088 | 0.510 | 1.686 | 0.45 | 1.685 |
| Day 3 00:30 | Day 3 00:30 | 10.40 | 0.095 | 9.000 | 1.77 | 1.76 | 0.0090 | 0.0088 | 0.452 | 1.800 | 0.52 | 1.798 |
| Day 2 22:30 | Day 2 22:30 | 8.33 | 0.090 | 9.000 | 1.76 | 1.76 | 0.0090 | 0.0088 | 0.517 | 1.793 | 0.52 | 1.769 |
| Day 2 20:30 | Day 2 20:30 | 8.87 | 0.092 | 9.000 | 1.75 | 1.79 | 0.0090 | 0.0084 | 0.505 | 1.680 | 0.47 | 1.638 |
| Day 2 18:35 | Day 2 18:35 | 11.80 | 0.103 | 9.000 | 1.79 | 1.83 | 0.0090 | 0.0077 | 0.446 | 1.855 | 0.47 | 1.843 |
| Day 2 16:10 | Day 2 16:10 | 8.73 | 0.085 | 9.000 | 1.83 | 1.84 | 0.0079 | 0.0076 | 0.459 | 1.833 | 0.39 | 1.826 |
| Day 2 14:30 | Day 2 14:30 | 8.83 | 0.078 | 9.000 | 1.83 | 1.82 | 0.0077 | 0.0075 | 0.388 | 1.951 | 0.43 | 1.952 |
| Day 2 12:35 | Day 2 12:35 | 7.16 | 0.072 | 9.000 | 1.83 | 1.83 | 0.0075 | 0.0074 | 0.432 | 1.878 | 0.42 | 1.871 |
| Day 2 10:35 | Day 2 10:35 | 8.12 | 0.076 | 9.000 | 1.83 | 1.82 | 0.0073 | 0.0073 | 0.415 | 1.834 | 0.38 | 1.825 |
| Day 2 08:25 | Day 2 08:25 | 8.73 | 0.076 | 9.000 | 1.81 | 1.82 | 0.0071 | 0.0072 | 0.378 | 1.830 | 0.40 | 1.824 |
| Day 2 06:30 | Day 2 06:30 | 8.84 | 0.079 | 9.000 | 1.82 | 1.82 | 0.0069 | 0.0071 | 0.400 | 1.826 | 0.41 | 1.819 |
| Day 2 04:05 | Day 2 04:05 | 8.86 | 0.080 | 9.000 | 1.82 | 1.82 | 0.0068 | 0.0070 | 0.408 | 1.829 | 0.41 | 1.827 |
| Day 2 02:30 | Day 2 02:30 | 8.82 | 0.080 | 9.000 | 1.82 | 1.82 | 0.0068 | 0.0070 | 0.410 | 1.833 | 0.36 | 1.834 |
| Day 2 00:35 | Day 2 00:35 | 8.74 | 0.074 | 9.000 | 1.82 | 1.82 | 0.0068 | 0.0070 | 0.362 | 1.830 | 0.39 | 1.829 |
| Day 1 22:40 | Day 1 22:40 | 8.80 | 0.078 | 9.000 | 1.82 | 1.82 | 0.0068 | 0.0070 | 0.393 | 1.834 | 0.39 | 1.832 |

Table 2 provides the data used to construct FIG. 3.

First LI data, based on present and past reactor operating parameters, are obtained and past analysis of a polymer product produced in the reactor under past leading indicator parameters are also obtained and then a new, best $LI_{target} = LI_T$ is calculated that relates to a desired future polymer product where the $LI_T$ is defined as:

$$LI_T = (\ln(FI_T) - A_1 - C'_1 \times FI_H)/C'_2;$$

where $A_1 = \ln(FI_O) - C'_2 \times LI_P - C'_1 \times FI_{HO}$ where: $FI_T$=the target flow index of a polymer product that is desired after adjustment of reaction conditions to a new leading indicator. $FI_O$ is the measured flow index of total polymer produced according to the previous leading indicator reactor conditions; $FI_{HO}$ is the flow index of the higher molecular weight polymer measured or calculated on polymer produced according to the previous leading indicator conditions; $C'_1$ is a constant related to the catalyst system, in this case equal to 3.386; $LI_P$ or the previous leading indicator, is the leading indicator calculated, by a single back average technique (SBA), from the previous time period for the time that $FI_O$ and $FI_{HO}$ measurements were performed. $FI_H$ is the flow index of the higher molecular weight polymer predicted to be produced by the catalyst system under current reactor parameters, at the time that the $LI_T$ is recalculated. In this case, $FI_H$ prediction accounted for the change in H2/C2 that was occurring. $C'_2$ is a constant related to the catalyst system, in this case equal to 1.863. At least one reactor parameter is adjusted to change the leading indicator toward the new $LI_T$ utilizing ethylene monomer and hexene comonomer, resulting in production of a polyethylene-based polymer product. In this particular example, the hydrogen/ethylene ratio is changed to achieve this result.

The fluidized bed was made up of polymer granules. During each run, the gaseous feed streams of ethylene and hydrogen were introduced upstream of the reactor bed into a recycle gas line. The injections were upstream of the recycle line heat exchanger and compressor. Liquid hexene and isopentane were introduced into the fluidized bed. Trimethylaluminum was added before the reactor bed into a recycle gas line in gaseous or liquid form. The individual flows of ethylene, hydrogen and hexene comonomer were controlled to maintain target reactor conditions. The concentrations of gases were measured by an on-line chromatograph.

In each run, supported bimetallic catalyst was injected directly into the fluidized bed using purified nitrogen. Catalyst injection rates were adjusted to maintain approximately constant production rate. In each run, the catalyst used was made with silica dehydrated at 875° C., and metallocene compound $Cp_2MX_2$ wherein each Cp is a n-butyl substituted cyclopentadienyl ring, M is zirconium, and X is fluoride. The titanium source was $TiCl_4$.

During each run, the reacting bed of growing polymer particles was maintained in a fluidized state by a continuous flow of the make-up feed and recycle gas through the reaction zone. Each run utilized a target reactor temperature ("Bed Temperature"), typically, a reactor temperature of about 203° F. or 95° C. During each run, reactor temperature was maintained at an approximately constant level by adjusting (up or down) the temperature of the recycle gas to accommodate any changes in the rate of heat generation due to the polymerization.

The reactor was stable with H2/C2 molar ratio of 0.0068. At TIME 1 (in Table 2, day 2, 0630 hours), and shown on FIG. 3, H2/C2 molar ratio began to be increased, with H2/C2 reaching 0.0090 by TIME 2 (in Table 2, day 2, 1835 hours). This increase caused a disturbance in the stable performance of the reactor, as can be seen from both the upper plot group (LI Target (comparative example 4); $LI_P$ example 3; and LI Target, example 3 with $FI_H$ impact) and lower plot group (FI and FI Target) in FIG. 3. By using the improved algorithm to determine Leading Indicator setpoint, in this case LI Target example 3 with $FI_H$ impact, the reactor would have stabilized faster. The improved algorithm predicts that LI setpoint should be decreased. Comparing LI requirements before and after the change, we see that the improved algorithm was correct; the LI target at the start of the time span shown in FIG. 3 is higher than the LI target at the end of this time span.

COMPARATIVE EXAMPLE 4

Control Action with No Leading Indicator Setpoint Adjustment Using $FI_H$

The reactor was stable with H2/C2 at the same molar ratio and times of example 3. At TIME 1, as discussed in the above example 3, H2/C2 molar ratio began to be increased, with H2/C2 reaching the level by TIME 2 also as discussed in example 3. This increase caused a disturbance in the stable performance of the reactor. Product FI, measured in the laboratory, decreased to below target values then increased to above target values before stabilizing (as seen in FIG. 3 for FI). These FI changes were significant enough to affect product performance and cause out of specification product that is of substantially lower value than prime specification product. The leading indicator setpoint in this example (shown as LI Target (comparative example 4) in the Figure) was not adjusted until about 10 hours after TIME 1. This leading indicator is shown in FIG. 3 as "LI Target comparative example 4". This late adjustment exacerbated the fluctuations in FI.

EXAMPLE 5

Impact of changes in $FI_H$ on Leading Indicator Setpoint

The following example shows the dramatic effect that changes in $FI_H$ have on the Leading Indicator setpoint. If $FI_H$ changes are not accounted for, the reactor produces lower-value polymer.

This example shows data from the same reaction system and catalyst as used in Example 3. The data shown in Table 3 represent average conditions over a period of several hours. FIG. 4 shows the Table 3 data in graphical form. Table 3 and FIG. 4 clearly show that as $FI_H$ increases, the LI must be lower to produce granule $I_{21.6}$ near the target of 10. The LI in this example is based on hexene-1 to ethylene feed and gas ratios.

Unless otherwise indicated, all numbers expressing quantities of ingredients, properties, reaction conditions, and so forth, used in the specification and claims are to be understood as approximations based on the desired properties sought to be obtained by the present invention, and the error of measurement, and should at least be construed in light of the number of reported significant digits and by applying ordinary rounding techniques. Notwithstanding that the numerical ranges and values setting forth the broad scope of the invention are approximations, the numerical values set forth are reported as precisely as possible.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

Various tradenames used herein are indicated by a ™ symbol, indicating that the names may be protected by certain trademark rights. Some such names may also be registered trademarks in various jurisdictions.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding

TABLE 3

Impact of FI H on Leading Indicator

| KEY REACTOR PARAMETERS | UNITS | Day 1 22:00 | Day 2 8:00 | Day 3 5:00 | Day 3 20:00 | Day 4 6:00 | Day 5 7:30 | Day 5 22:00 | Day 6 10:00 |
|---|---|---|---|---|---|---|---|---|---|
| Production Rate | Ton/hr | 12.27 | 11.39 | 10.30 | 33.21 | 34.46 | 36.15 | 36.76 | 35.31 |
| Ethylene partial pressure | bara | 11.18 | 11.12 | 11.01 | 14.15 | 14.08 | 14.08 | 13.98 | 13.96 |
| H2/C2 molar ratio in cycle gas | mol/mol | 0.0111 | 0.0111 | 0.0110 | 0.0111 | 0.0090 | 0.0070 | 0.0070 | 0.0070 |
| Co-catalyst feedrate | wt ppm | 101 | 110 | 123 | 115 | 115 | 115 | 116 | 120 |
| Granule I21.6 (FI) | dg/min | 9.68 | 13.46 | 10.50 | 9.91 | 8.90 | 8.74 | 8.68 | 8.73 |
| Granule I2.16 | dg/min | 0.07 | 0.09 | 0.09 | 0.11 | 0.10 | 0.08 | 0.08 | 0.08 |
| FI H, calculated | dg/min | 0.315 | 0.304 | 0.427 | 0.604 | 0.562 | 0.451 | 0.458 | 0.448 |
| C6 LEAD INDICATOR | | 2.28 | 2.20 | 2.06 | 1.57 | 1.56 | 1.66 | 1.60 | 1.60 |

While the present invention has been described and illustrated by reference to some embodiments, those of ordinary skill in the art will appreciate that the invention lends itself to many different variations not illustrated herein. For these reasons, then, reference should be made solely to the appended claims for purposes of determining the scope of the present invention. Further, certain features of the present invention are described in terms of a set of numerical upper limits and a set of numerical lower limits. It should be appreciated that ranges formed by any combination of these limits are within the scope of the invention unless otherwise indicated.

embodiments described herein may be utilized. Accordingly, the appended claims are intended to include within their scope such processes, machines, manufacture, compositions of matter, means, methods, or steps.

What is claimed is:

1. A method of olefin polymerization, the method comprising:
   (a) determining a flow ratio to a polymerization reactor, $FR_1$, of a comonomer flow rate to a monomer flow rate provided to the reactor; determining the concentration ratio, $GR_1$, of the concentration of the comonomer to the concentration of the monomer in a recycle stream of the reactor, (b) obtaining a leading indicator function, LI, defined by:

$$LI = \frac{FR_1}{GR_1} = \frac{(\beta)(FR_2) + (1-\beta)(FR_3)}{GR_1} \qquad (1a)$$

where $GR_1$ is the present value of the comonomer/ethylene concentration ratio at time T in the reactor, as determined by analysis of the recycle stream;

where $FR_1$ is the present value of the flow ratio of the comonomer flow rate to monomer flow rate into the reactor, expressed as an exponentially weighted moving average (EWMA) at time T;

where $FR_2$ is the instantaneous flow ratio td minutes prior to time T;

where $FR_3$ is an EWMA using the comonomer residence time td minutes prior to time T−1;

where td is the delay time for recycle gas analysis;

where $\beta = 1-\exp(-T/(\text{comonomer residence time})) = 1-\exp(-\Delta t/\tau)$;

where $\Delta t$ = the time step chosen to update the LI calculation;

where $\tau$ = the residence time in the reactor of the comonomer that is used to calculate the LI with the proviso that the comonomer dissolved in the polymerized olefin is included in said comonomer used to calculate the LI;

(c) comparing the LI to a target value;

(d) adjusting at least one reactor parameter in response to a deviation between the LI and the target value; and (e) controlling a polymer product property.

2. The method of claim 1, wherein the olefin polymerization takes place in a reactor selected from the group consisting of a solution reactor, a slurry loop reactor, a supercritical loop reactor, or a fluidized-bed, gas-phase reactor.

3. The method of claim 1, wherein the olefin polymerization takes place in a gas-phase fluidized bed reactor.

4. The method of claim 1, wherein the monomer is ethylene and the comonomer is selected from the group consisting of $C_3$-$C_{12}$ alpha-olefins and mixtures thereof.

5. The method of claim 1, wherein the monomer is ethylene and the comonomer is selected from the group consisting of $C_3C_8$ alpha-olefins and mixtures thereof.

6. The method of claim 1, wherein the monomer is ethylene and the comonomer is selected from the group consisting of $C_3$-$C_6$ alpha-olefins and mixtures thereof.

7. The method of claim 1, wherein the at least one reactor parameter is selected from the group consisting of monomer feed rate, comonomer feed rates, catalyst feed rates, cocatalyst feed rates, hydrogen feed rate, reactor temperature, monomer partial pressure, comonomer partial pressure, hydrogen partial pressure, water feed rate, carbon dioxide feed rate, impurity feedrate, condensing agent feedrate, isopropyl alcohol feedrate, oxygen feedrate, and combinations thereof.

8. The method of claim 1, wherein the olefin polymerization is catalyzed by a catalyst system comprising at least one first catalyst and at least one second catalyst, wherein the method produces a polymer product comprising a molecular weight distribution or a composition distribution, or both, that are broad or bimodal, or both.

9. The method of claim 8, wherein the adjusting of said at least one reactor parameter is effective to alter the relative productivity of the at least one said first or the at least one said second catalysts.

10. The method of claim 8, wherein the catalyst system comprises at least one metallocene catalyst and at least one non-metallocene catalyst.

11. The method of claim 10, wherein the at least one metallocene and the at least one non-metallocene catalysts are supported and are both present on the same support.

12. The method of claim 1, further comprising producing a polymer product, wherein the olefin polymerization is catalyzed by a supported bimetallic catalyst system comprising at least one metallocene catalyst and at least one non-metallocene transition metal catalyst, and wherein said polymer product comprises a molecular weight distribution, a composition distribution, or both a molecular weight distribution and a composition distribution, that are broad or bimodal, or both broad and bimodal.

13. The method of claim 10, 11, or 12 wherein the at least one metallocene catalyst compound is $(RCp)_2MX_2$, wherein Cp is a substituted cyclopentadienyl ring, M is a Group 4 metal; R is an alkyl, and X is a halide.

14. The method of claim 13, wherein M is zirconium; R is n-butyl, and X is fluoride.

15. A process for polymerizing olefins in a gas-phase fluidized bed polymerization reactor, the process comprising:

(a) determining a flow ratio into the polymerization reactor, $FR_1$, of a comonomer flow rate to a monomer flow rate provided to the reactor; determining the concentration ratio, $GR_1$, of the comonomer concentration to the monomer concentration in a recycle gas stream of the reactor, (b) obtaining a leading indicator function, LI, defined by:

$$LI = \frac{FR_1}{GR_1} = \frac{(\beta)(FR_2) + (1-\beta)(FR_3)}{GR_1} \qquad (1a)$$

where $GR_1$ is the present value of the comonomer/ethylene concentration ratio at time T in the reactor, as determined by analysis of the recycle gas stream;

where $FR_1$ is the present value of the flow ratio of the comonomer flow rate to monomer flow rate into the reactor, expressed as an exponentially weighted moving average (EWMA) at time T;

where $FR_2$ is the instantaneous flow ratio td minutes prior to time T;

where $FR_3$ is an EWMA using the comonomer residence time td minutes prior to time T−1;

where td is the delay time for recycle gas analysis;

where $\beta = 1-\exp(-T/(\text{comonomer residence time})) = 1-\exp(-\Delta t/\tau)$;

where $\Delta t$ = the time step chosen to update the LI calculation;

where $\tau$ = the residence time in the reactor of the one of comonomer that is used to calculate the LI, with the proviso that the comonomer dissolved in a polymer made in the olefin polymerization, is included in said comonomer used to calculate the LI;

(c) comparing the LI to a target value; and (d) adjusting at least one reactor parameter in response to a deviation between the LI and the target value;

wherein said polymerization comprises said ethylene, said comonomer selected from 1-butene, 1-hexene or combinations thereof, and hydrogen;

wherein the olefin polymerization is catalyzed by a supported bimetallic catalyst system comprising at least one metallocene catalyst and at least one non-metallocene transition metal catalyst, and wherein said polymer product comprises a molecular weight distribution, a composition distribution, or both a molecular weight distribution and a composition distribution, that are broad or bimodal, or both broad and bimodal;

wherein the at least one metallocene catalyst compound is $(RCp)_2MX_2$, wherein Cp is a substituted cyclopentadienyl ring, M is zirconium; R is a n-butyl, and X is fluoride;

wherein the at least one reactor parameter is selected from the group consisting of monomer feed rate, comonomer feed rates, catalyst feed rates, cocatalyst feed rates, hydrogen feed rate, reactor-temperature, monomer partial pressure, comonomer partial pressure, hydrogen partial pressure, water feed rate, carbon dioxide feed rate, impurity feedrate, condensing agent feedrate, isopropyl alcohol feedrate, oxygen feedrate, and combinations thereof.

16. A method of olefin polymerization, the method comprising:

(a) determining a flow ratio to a polymerization reactor, $FR_1$, of a hydrogen flow rate to a monomer flow rate provided to the reactor; determining the concentration ratio, $GR_1$, of the concentration of the hydrogen to the concentration of the monomer in a recycle stream of the reactor, (b) obtaining a leading indicator function, LI, defined by:

$$LI = \frac{FR_1}{GR_1} = \frac{(\beta)(FR_2) + (1-\beta)(FR_3)}{GR_1}$$

where $GR_1$ is the present value of the hydrogen/ethylene concentration ratio at time T in the reactor, as determined by analysis of the recycle stream;

where $FR_1$ is the present value of the flow ratio of the hydrogen flow rate to monomer flow rate, expressed as an exponentially weighted moving average (EWMA) at time T;

where $FR_2$ is the instantaneous flow ratio td minutes prior to time T;

where $FR_3$ is an EWMA using the hydrogen residence time td minutes prior to time T−1;

where td is the delay time for recycle gas analysis;

where $\beta=1-\exp(-T/(\text{hydrogen residence time}))=1-\exp(-\Delta t/\tau)$;

where $\Delta t$=the time step chosen to update the LI calculation;

where $\tau$=the residence time in the reactor of the hydrogen;

(c) comparing the LI to a target value;

(d) adjusting at least one reactor parameter in response to a deviation between the LI and the target value; and (e) controlling a polymer product property.

17. The method of claim 16, wherein the olefin polymerization takes place in a reactor selected from the group consisting of a solution reactor, a slurry loop reactor, a supercritical loop reactor, or a fluidized-bed, gas-phase reactor.

18. The method of claim 16, wherein the olefin polymerization takes place in a gas-phase fluidized bed reactor.

19. The method of claim 16, wherein the at least one reactor parameter is selected from the group consisting of monomer feed rate, comonomer feed rates, catalyst feed rates, cocatalyst feed rates, hydrogen feed rate, reactor temperature, monomer partial pressure, comonomer partial pressure, hydrogen partial pressure, water feed rate, carbon dioxide feed rate, impurity feedrate, condensing agent feedrate, isopropyl alcohol feedrate, oxygen feedrate, and combinations thereof.

20. The method of claim 16, wherein the olefin polymerization is catalyzed by a catalyst system comprising at least one first catalyst and at least one second catalyst, wherein the method produces a polymer product comprising a molecular weight distribution or a composition distribution, or both, that are broad or bimodal, or both.

21. The method of claim 20, wherein the adjusting of said at least one reactor parameter is effective to alter the relative productivity of the at least one said first or the at least one said second catalysts.

22. The method of claim 21, wherein the catalyst system comprises at least one metallocene catalyst and at least one non-metallocene catalyst.

23. The method of claim 22, wherein the at least one metallocene and the at least one non-metallocene catalysts are supported and are both present on the same support.

24. The method of claim 16, further comprising producing a polymer product, wherein the olefin polymerization is catalyzed by a supported bimetallic catalyst system comprising at least one metallocene catalyst and at least one non-metallocene transition metal catalyst, and wherein said polymer product comprises a molecular weight distribution, a composition distribution, or both a molecular weight distribution and a composition distribution, that are broad or bimodal, or both broad and bimodal.

25. The method of claim 24, wherein the at least one metallocene catalyst compound is $(RCp)_2MX_2$, wherein Cp is a substituted cyclopentadienyl ring, M is a Group 4 metal; R is an alkyl, and X is a halide.

26. The method of claim 25, wherein M is zirconium; R is n-butyl, and X is fluoride.

27. A process for polymerizing olefins in a gas-phase fluidized bed polymerization reactor, the process comprising:

(a) determining a flow ratio into the polymerization reactor, $FR_1$, of a hydrogen flow rate to a monomer flow rate provided to the reactor; determining the concentration ratio, $GR_1$, of the hydrogen concentration to the monomer concentration in a recycle gas stream of the reactor, (b) obtaining a leading indicator function, LI, defined by:

$$LI = \frac{FR_1}{GR_1} = \frac{(\beta)(FR_2) + (1-\beta)(FR_3)}{GR_1}$$

where $GR_1$ is the present value of the hydrogen/ethylene concentration ratio at time T in the reactor, as determined by analysis of the recycle gas stream;

where $FR_1$ is the present value of the flow ratio of the hydrogen flow rate to monomer flow rate into the reactor, expressed as an exponentially weighted moving average (EWMA) at time T;

where $FR_2$ is the instantaneous flow ratio td minutes prior to time T;

where $FR_3$ is an EWMA using the hydrogen residence time td minutes prior to time T−1;

where td is the delay time for recycle gas analysis;

where $\beta=1-\exp(-T/(\text{hydrogen residence time}))=1-\exp(-\Delta t/\tau)$;

where $\Delta t$ =the time step chosen to update the LI calculation; and where $\tau$=the residence time in the reactor of the hydrogen that is used to calculate the LI;

(c) comparing the LI to a target value; and (d) adjusting at least one reactor parameter in response to a deviation between the LI and the target value;

wherein said polymerization comprises said ethylene, a comonomer selected from 1-butene, 1-hexene or combinations thereof, and hydrogen;

wherein the olefin polymerization is catalyzed by a supported bimetallic catalyst system comprising at least one metallocene catalyst and at least one non-metallocene transition metal catalyst, and wherein said polymer product comprises a molecular weight distribution, a composition distribution, or both a molecular weight distribution and a composition distribution, that are broad or bimodal, or both broad and bimodal;

wherein the at least one metallocene catalyst compound is $(RCp)_2MX_2$, wherein Cp is a substituted cyclopentadienyl ring, M is zirconium; R is a n-butyl, and X is fluoride;

wherein the at least one reactor parameter is selected from the group consisting of monomer feed rate, comonomer feed rates, catalyst feed rates, cocatalyst feed rates, hydrogen feed rate, reactor temperature, monomer partial pressure, comonomer partial pressure, hydrogen partial pressure, water feed rate, carbon dioxide feed rate, impurity feedrate, condensing agent feedrate, isopropyl alcohol feedrate, oxygen feedrate, and combinations thereof.

* * * * *